United States Patent
Dou et al.

(10) Patent No.: US 12,521,033 B2
(45) Date of Patent: Jan. 13, 2026

(54) METHOD AND SYSTEM FOR LOW-FIELD MRI DENOISING WITH A DEEP COMPLEX-VALUED CONVOLUTIONAL NEURAL NETWORK

(71) Applicant: University of Virginia Patent Foundation, Charlottesville, VA (US)

(72) Inventors: Quan Dou, Charlottesville, VA (US); Zhixing Wang, Charlottesville, VA (US); Xue Feng, Zion Crossroads, VA (US); Craig H. Meyer, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 460 days.

(21) Appl. No.: 18/305,296

(22) Filed: Apr. 21, 2023

(65) Prior Publication Data

US 2023/0380714 A1    Nov. 30, 2023

Related U.S. Application Data

(60) Provisional application No. 63/333,232, filed on Apr. 21, 2022.

(51) Int. Cl.
*A61B 5/055* (2006.01)

(52) U.S. Cl.
CPC .... *A61B 5/055* (2013.01); *G06T 2207/10088* (2013.01); *G06T 2207/20081* (2013.01); *G06T 2207/20084* (2013.01)

(58) Field of Classification Search
CPC . A61B 5/055; A61B 5/0042; A61B 2576/026; A61B 5/7214;
(Continued)

(56) References Cited

U.S. PATENT DOCUMENTS

2008/0219535 A1*  9/2008  Mistretta ............... G06T 11/006
                                                                382/131
2014/0152304 A1*  6/2014  Fielden ................. G01R 33/565
                                                                324/309
(Continued)

OTHER PUBLICATIONS

Havsteen I, Ohlhues A, Madsen KH, et al. Are Movement Artifacts in Magnetic Resonance Imaging a Real Problem?—A Narrative Review. Front Neurol. 2017;8:232. doi: 10.3389/fneur.2017.00232. PMCID: PMC5447676.

(Continued)

*Primary Examiner* — Van D Huynh
(74) *Attorney, Agent, or Firm* — Meunier Carlin & Curfman LLC

(57) ABSTRACT

Blurring and noise artifacts in magnetic resonance (MR) images caused by off-resonant image components may be corrected with convolutional neural networks, particularly feed forward networks with skip connections. Demodulating complex blurred images with off-resonant artifacts at a selected number of frequencies forms a respective real component frame of the MR data and a respective imaginary component frame for each image. A convolutional neural network is used to de-blur the images. The network has a plurality of residual blocks with multiple convolution calculations paired with respective skip connections. The method outputs, from the convolutional neural network, a de-blurred real image frame and a de-blurred imaginary image frame of the MR data for each complex blurred image.

20 Claims, 10 Drawing Sheets

(58) Field of Classification Search
CPC . G06T 2207/10088; G06T 2207/20081; G06T 2207/20084; G06T 5/60; G06T 5/70; G06T 5/73; G06T 2207/30016; G01R 33/4835; G01R 33/5608; G01R 33/565
See application file for complete search history.

(56) References Cited

U.S. PATENT DOCUMENTS

| | | | |
|---|---|---|---|
| 2019/0285713 A1* | 9/2019 | Polak | G06N 20/00 |
| 2019/0347772 A1* | 11/2019 | Zhang | G01R 33/565 |
| 2020/0033431 A1* | 1/2020 | Schlemper | G06T 5/60 |
| 2020/0294287 A1* | 9/2020 | Schlemper | G16H 30/40 |
| 2022/0188602 A1 | 6/2022 | Meyer et al. | |
| 2022/0292679 A1* | 9/2022 | Ahn | G06V 10/82 |
| 2022/0373630 A1 | 11/2022 | Dou et al. | |
| 2022/0375035 A1* | 11/2022 | Chatterjee | G06N 3/045 |
| 2023/0122915 A1* | 4/2023 | Nehrke | G06N 3/08 702/85 |
| 2023/0134806 A1* | 5/2023 | Mallaiyan Sathiaseelan | G06N 3/08 382/275 |
| 2024/0095889 A1* | 3/2024 | Wu | G06N 3/0455 |
| 2025/0251478 A1* | 8/2025 | Gessert | G06T 5/70 |

OTHER PUBLICATIONS

Edwards AD, Arthurs OJ. Paediatric MRI under sedation: is it necessary? What is the evidence for the alternatives? Pediatr Radiol. 2011;41(11):1353-1364. doi: 10.1007/s00247-011-2147-7.
McGibney G, Smith MR, Nichols ST, Crawley A. Quantitative evaluation of several partial Fourier reconstruction algorithms used in MRI. Magn Reson Med. 1993;30(1):51-59.
Pruessmann KP, Weiger M, Scheidegger MB, Boesiger P. SENSE: sensitivity encoding for fast MRI. Magn Reson Med. 1999;42(5):952-962.
Griswold MA, Jakob PM, Heidemann RM, et al. Generalized autocalibrating partially parallel acquisitions (GRAPPA). Magn Reson Med. 2002;47(6):1202-1210.
Lustig M, Pauly JM. SPIRIT: Iterative self-consistent parallel imaging reconstruction from arbitrary k-space. Magn Reson Med. 2010;64(2):451-471. doi: 10.1002/mrm.22428. PMCID: PMC2925465.
Lustig M, Donoho D, Pauly JM. Sparse MRI: The application of compressed sensing for rapid MR imaging. Magn Reson Med. 2007;58(6):1182-1195.
Glover GH, Li TQ, Ress D. Image-based method for retrospective correction of physiological motion effects in fMRI: RETROICOR. Magn Reson Med. 2000;44(1):162-167.
Maclaren J, Herbst M, Speck O, Zaitsev M. Prospective motion correction in brain imaging: a review. Magn Reson Med. 2013;69(3):621-636. doi: 10.1002/mrm.24314.
Buades, A., Coll, B., Morel, J.-M.: Non-Local Means Denoising. Image Processing On Line. 1, (2011), 208-212.
Dabov, K., Foi, A., Katkovnik, V., Egiazarian, K.: Image denoising with block-matching and 3D filtering. Image Processing: Algorithms and Systems, Neural Networks, and Machine Learning. SPIE (2006), 6064:354-365.
Çiçek, Özgün et al., 3D U-Net: Learning Dense Volumetric Segmentation from Sparse Annotation published in MICCAI 2016, 6064:424-432.
Zhang, K., Zuo, W., Chen, Y., Meng, D., Zhang, L.: Beyond a Gaussian Denoiser: Residual Learning of Deep CNN for Image Denoising. IEEE Transactions on Image Processing. 26, 3142-3155 (2017).
Ulyanov, D., Vedaldi, A., Lempitsky, V.: Deep image prior. arXiv Preprints. (2017). 22 pages.
Zbontar J, Knoll F, Sriram A, et al. fastMRI: An Open Dataset and Benchmarks for Accelerated MRI. 2018. arXiv:1811.08839 [cs.CV]. 35 pages.
Maggioni M, Katkovnik V, Egiazarian K, Foi A. Nonlocal transform-domain filter for volumetric data denoising and reconstruction. IEEE Trans Image Process. 2013;22(1):119-133. doi: 10.1109/TIP.2012.2210725.
Zhang X, Zhou X, Lin M, Sun J. ShuffleNet: An Extremely Efficient Convolutional Neural Network for Mobile Devices. arXiv Preprints. 2017. arXiv:1707.01083. 9 pages.
Cocosco CA, Kollokian V, Kwan RK, Evans AC. BrainWeb: Online Interface to a 3D MRI Simulated Brain Database. NeuroImage, 1997;5(4):S425.
Kwan RK, Evans AC, Pike GB. MRI simulation-based evaluation of image-processing and classification methods. IEEE Trans Med Imaging. 1999;18(11):1085-1097.
Kwan RK, Evans AC, Pike GB. An Extensible MRI Simulator for Post-Processing Evaluation. Visualization in Biomedical Computing (VBC'96). Lecture Notes in Computer Science, vol. 1131. Springer-Verlag, 1996. 135-140.
Collins DL, Zijdenbos AP, Kollokian V, et al. Design and Construction of a Realistic Digital Brain Phantom. IEEE Trans Med Imaging. 1998; 17(3):463-468.
Zhang K, Zuo W, Chen Y, Meng D, Zhang L. Beyond a Gaussian Denoiser: Residual Learning of Deep CNN for Image Denoising. Aug. 13, 2016. arXiv:1608.03981 [cs.CV].
Trabelsi C, Bilaniuk O, Zhang Y, et al. Deep Complex Networks. Feb. 25, 2018. arXiv:1705.09792 [cs.NE]. 19 pages.
Noll DC, Meyer CH, Pauly JM, Nishimura DG, Macovski A. A homogeneity correction method for magnetic resonance imaging with time-varying gradients. IEEE Trans Med Imaging. 1991;10(4):629-37.
Man LC, Pauly JM, Macovski A. Multifrequency interpolation for fast off-resonance correction. Magn Reson Med. May 1997;37(5):785-92.
Ahunbay E, Pipe JG. Rapid method for deblurring spiral MR images. MagnReson Med. Sep. 2000;44(3):491-4.
Sutton BP, Noll DC, Fessler JA. Fast, iterative image reconstruction for MRI in the presence of field inhomogeneities. IEEE Trans Med Imaging. Feb. 2003;22(2):178-88.
Noll DC, Pauly JM, Meyer CH, Nishimura DG, Macovski A. Deblurring for non-2D Fourier transform magnetic resonance imaging. Magn Reson Med. Jun. 1992;25(2):319-33.
Man LC, Pauly JM, Macovski A. Improved automatic off-resonance correction without a field map in spiral imaging. Magn Reson Med. Jun. 1997;37(6):906-13.
Zeng DY, Shaikh J, Holmes S, Brunsing RL, Pauly JM, Nishimura DG, Vasanawala SS, Cheng JY. Deep residual network for off-resonance artifact correction with application to pediatric body MRA with 3D cones. Magn Reson Med. Oct. 2019;82(4):1398-1411.
Lim Y, Bliesener Y, Narayanan S, Nayak KS. Deblurring for spiral real-time MRI using convolutional neural networks. Magn Reson Med. Dec. 2020;84(6):3438-3452.
Zbontar J, Tygert M. Simulating single-coil MRI from the responses of multiple coils. 2018. arXiv:1811.08026 [eess.IV]. 14 pages.
He K, Zhang X, Ren S, Sun J. Deep residual learning for image recognition. 2015. arXiv:1512.03385 [cs.CV]. 9 pages.
Paszke A, Gross S, Massa F, et al. PyTorch: An Imperative Style, High-Performance Deep Learning Library. 2019. arXiv:1912.01703 [cs.LG]. 12 pages.
Kingma DP, Ba J. Adam: A Method for Stochastic Optimization. 2014. arXiv:1412.6980 [cs.LG] 15 pages.
Chen W, Meyer CH. Semiautomatic off-resonance correction in spiral imaging. Magn Reson Med. May 2008;59(5):1212-9.

* cited by examiner

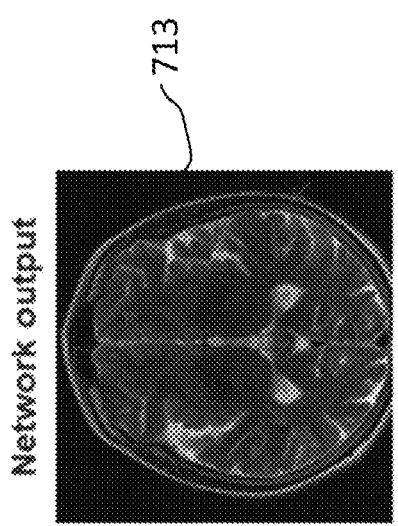
FIG. 7A Ground truth
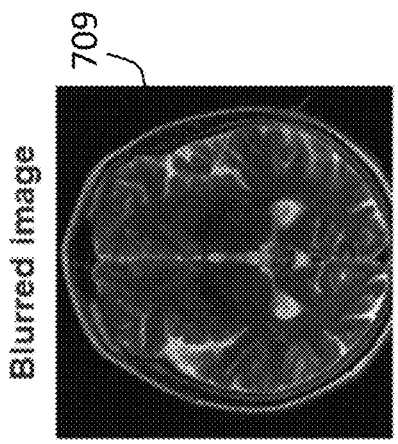
FIG. 7C Blurred image
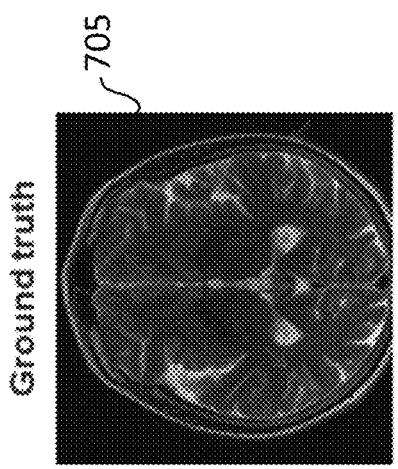
FIG. 7D Network output
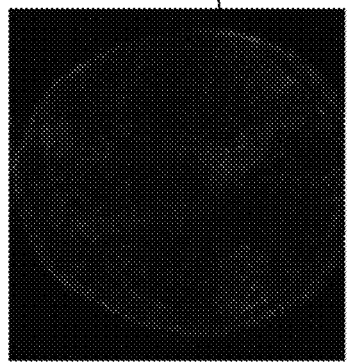
FIG. 7B Simulated field map
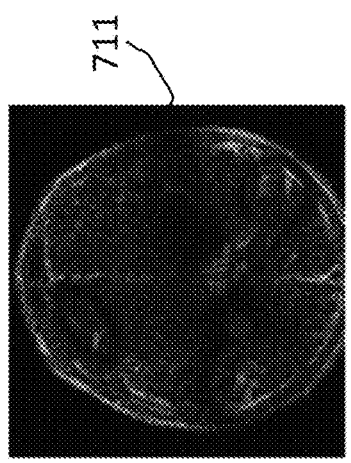
FIG. 7E Difference (×4)
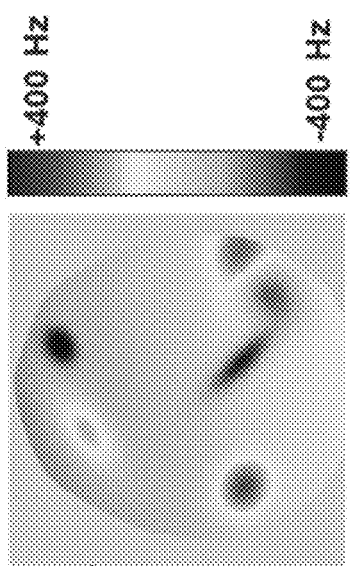
FIG. 7F Difference (×4)

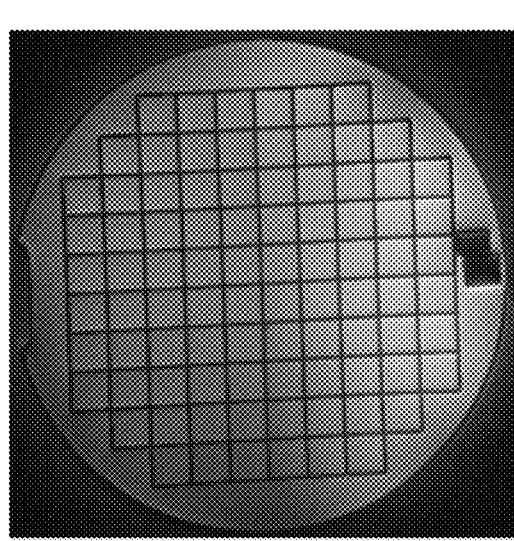
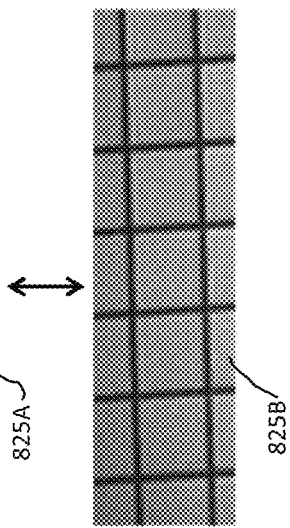
FIG. 8C
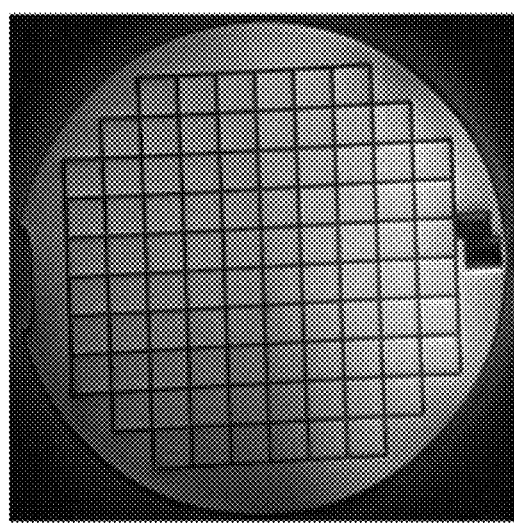
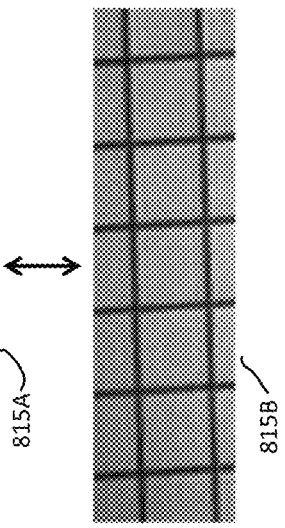
FIG. 8B
FIG. 8A

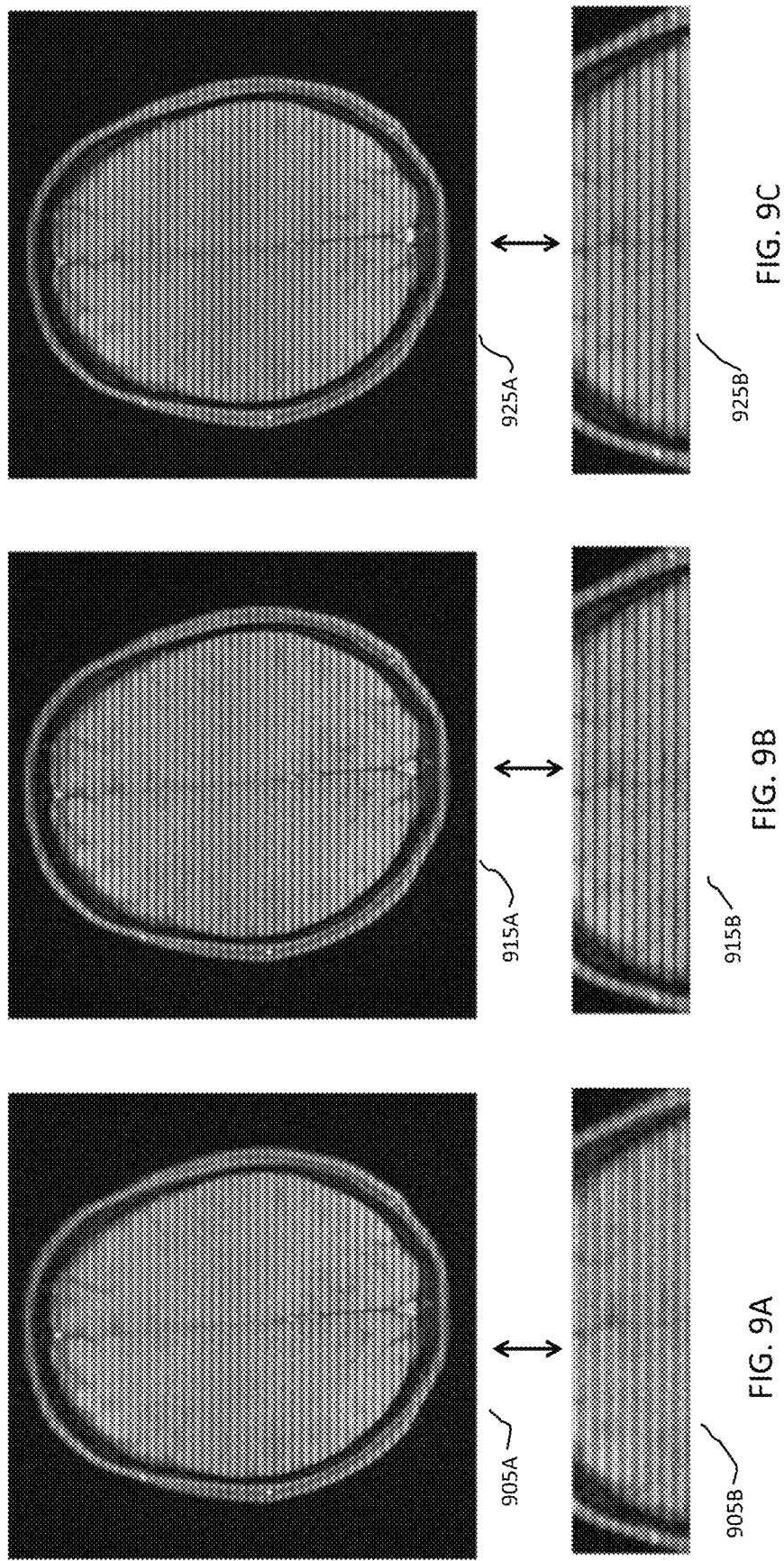

METHOD AND SYSTEM FOR LOW-FIELD MRI DENOISING WITH A DEEP COMPLEX-VALUED CONVOLUTIONAL NEURAL NETWORK

CROSS-REFERENCE TO RELATED APPLICATION

This Application claims priority to and benefit of U.S. Provisional Patent Application Ser. No. 63/333,232 entitled "Method and System for Automatic Off-Resonance Correction for Spiral Imaging with a Convolutional Neural Network," filed Apr. 21, 2022, which is hereby incorporated by reference herein in its entirety as if fully set forth below.

STATEMENT OF GOVERNMENT INTEREST

This invention was made with government support under Grant No. EB028773, awarded by the National Institutes for Health. The government has certain rights in the invention.

FIELD

The present disclosure relates to systems and methods for denoising magnetic resonance images using complex denoising convolutional neural networks.

BACKGROUND

Magnetic resonance imaging (MRI) is an important diagnostic tool for various conditions, including brain conditions. Because of the good soft tissue contrast, non-invasiveness and lack of ionizing radiation of MRI, it is widely used as a diagnostic tool for brain conditions including stroke, tumors, multiple sclerosis (MS), hemorrhage, blood vessel issues, and neurodegenerative diseases. A clinical protocol often includes pre- and post-contrast T1, T2, fluid-attenuated inversion recovery (FLAIR), proton density (PD) and diffusion weighted images (DWI). Other advanced sequences such as magnetic resonance angiography (MRA) and perfusion MRI using dynamic susceptibility contrast (DSC) and arterial spin labelling (ASL) are also used for specific conditions. Although different contrasts provide enriched diagnostic information, the challenges are prolonged scan time and increased artifacts due to motion [1], especially for pediatric patients who have trouble holding still during the scan and thus sedation/anesthesia is often needed for a successful exam [2].

Extensive studies have been performed to accelerate MRI and reduce motion artifacts with the application to the brain and other regions of the body. Most studies have focused on improving the data acquisition strategies, such as using partial Fourier [3], parallel imaging [4-6] and compressed sensing [7] to reduce the number of acquired k-space lines without introducing aliasing, many of which are already widely used in clinical protocols. Retrospective [8] and prospective [9] motion correction methods have also been developed to specifically reduce the artifacts. However, these acquisition strategies often introduce trade-offs among speed, resolution and image quality, which is typically evaluated by the real or apparent signal-to-noise ratio (SNR), so that further acceleration of the scan can lead to reduced SNR and/or spatial resolution. In clinical practice, these aspects are balanced to yield a standard protocol. Denoising algorithms, which are applied during post-processing, can increase SNR without introducing any negative effects to the acquisition process and thus have the potential to shift the balance towards more aggressive acceleration and compensate for the reduced SNR in the original images.

Denoising algorithms can improve signal-to-noise ratio (SNR) without prolonging the scan time. Filter-based denoising methods, such as non-local means (NLM) and block-matching and 3D filtering (BM3D), suffer when dealing with small lesion regions and non-uniform noise patterns due to parallel imaging and B1 inhomogeneity from multiple coils. Recently deep convolutional neural networks have been developed for denoising; however, they require high-quality training data, which is difficult to obtain in practice. The networks are usually trained with the noise-corrupted images as the input and the noise-reduced/noise-free images as the output. The input can be simulated from the output images by adding noise at one or multiple levels with the desired distribution or from actual images acquired with low SNR. The DCNN can then learn from the "examples" to achieve good denoising when the new images are similar to those in the training dataset. In addition to its improved performance, the DCNN is also much faster to run as only one forward pass is required once it is trained.

In clinical practice, a clear MRI with high signal to noise ratio (SNR) is usually favored for accurate lesion detection and diagnosis. Improving the SNR of MRI can be achieved by changing the parameters of acquisition sequences such as using more averages and lower bandwidth; however, this often comes with prolonged scan time. On the contrary, improving SNR with denoising algorithms during post-processing would not change the scan process and therefore is an attractive alternative option. Most of the denoising algorithms can be categorized as traditional filter-based methods and learning-based methods. Filter-based methods, including non-local means (NLM) and block-matching and 3D filtering (BM3D) [11], often rely on repetitive structures in the images so that local or global averages can be applied to reduce noise. The main disadvantages of these methods include the following: 1) a large number of similar structures need to exist in the input images to achieve good performance, which can become problematic for fine structures and pathological regions as fewer such blocks exist; and 2) the performance is highly dependent on algorithm parameters, which can vary significantly for different sequences and noise levels, especially when advanced image acquisition methods, such as parallel imaging with multiple receiver coils, are used, as the noise distribution is much more complicated.

Now with reference to prior art FIG. 3, a U-Net is a convolutional neural network architecture. U-Nets may be effective for tasks where the output is of similar size as the input and the output needs a similar level of spatial resolution. This makes a U-Net effective for super resolution image processing. To perform classification using a convolutional neural network the image is down-sampled into one or more classifications using a series of stride two convolutions reducing the grid size each time. To be able to output a generated image of the same size as the input, or larger, an up-sampling path is used to increase the grid size.

The up-sampling/decoder path may include several transposed convolutions can be used, where each transposed convolution adds pixels between and around the existing pixels. Each up-sample in the decoder/up-sampling part of the network can add pixels around the existing pixels and also between the existing pixels to eventually reach the desired resolution. Replication padding is then performed to provide an extra pixel around the image. Then average pooling can be performed to extract features smoothly. After new pixels are added, the subsequent convolutions can improve the level of detail as the path continues through the decoder path of the network an upscaling step increases the dimensions of the image.

The 3D UNet was originally proposed by Cicek et al. [12] for automatic segmentation of Xenopus (a highly aquatic frog) kidney. It has an encoder-decoder style architecture with skip connections between corresponding layers in encoding and decoding paths. This architecture is very popular for medical image segmentation. FIG. 3 shows the block representation of 3D UNet architecture.

Each convolutional block has two convolutions followed by max pooling. Every convolution is immediately followed by a rectified linear unit (ReLU) activation and batch normalization layer. Each deconvolutional block consists of two convolutions followed by a deconvolution to regain spatial dimension. Moreover, there are skip connections from the encoding path to decoding path at corresponding spatial dimensions. These are shown by green arrows. The very final convolution generates a three-dimensional feature map and is followed by activation in order to obtain a pseudo-random probability distribution at each pixel representing its class membership.

Deep convolutional neural networks (DCNN) with various architectures have yielded performance superior to traditional methods [13]. These networks are usually trained with the noise-corrupted images as the input and the noise-free images as the target output. The DCNN can then learn from the "examples" to achieve good denoising when the new images are similar to those in the training data. However, a disadvantage is the sole reliance on the training data, or good "examples", which are difficult to obtain in practice. Simulating low SNR images by adding noise often uses a very simplified noise model with a spatially uniform Gaussian or Rician distribution, and thus cannot represent more complicated cases with non-uniform noise from multiple coils. Acquiring paired low and high SNR images can overcome this issue but suffers from any mismatches between the two acquisitions. As the number of training examples from each sequence type may need to be large and diverse to obtain good performance, the data collection can be challenging and expensive. Furthermore, if a sequence type is not in the training set, it is doubtful whether the model can generalize to this sequence. In order to solve the problem of over-dependence on training data, an unsupervised deep convolutional neural network (U-DCNN) that does not require training from "examples" but relies on different characteristics of the network against signal and noise was recently proposed and produced compelling results on denoising natural images [14].

BRIEF SUMMARY OF THE DISCLOSURE

This disclosure includes, in one implementation, a computer-implemented method of denoising a magnetic resonance (MR) image. The first step of the method includes acquiring complex magnetic resonance (MR) image data of an area of interest of a subject, wherein the image data includes complex blurred images of multi-coil MR image data, and wherein the complex blurred images include resonant image data and off-resonance artifact data. For each of the complex blurred images, the method includes demodulating the complex blurred images at a selected number (n) of frequencies to form, for each of the n frequencies, a respective real component frame of the MR data and a respective imaginary component frame of the MR data. Compiling a layered data set includes stacking the respective real component frames and the respective imaginary component frames. The method uses the layered data set as an input to a convolutional neural network (CNN) having a plurality of residual blocks, wherein the residual blocks incorporate multiple convolution calculations paired with respective skip connections. The method outputs, from the CNN, a de-blurred real image frame and a de-blurred imaginary image frame of the MR data for each complex blurred image.

In another embodiment, a system for denoising a magnetic resonance (MR) image, includes one or more processors and a memory device coupled to the one or more processors and storing instructions which, when executed by the one or more processors, cause the system to perform functions that include a computer-implemented method of denoising a magnetic resonance (MR) image. The first step of the method includes acquiring complex magnetic resonance (MR) image data of an area of interest of a subject, wherein the image data includes complex blurred images of multi-coil MR image data, and wherein the complex blurred images include resonant image data and off-resonance artifact data. For each of the complex blurred images, the method includes demodulating the complex blurred images at a selected number (n) of frequencies to form, for each of the n frequencies, a respective real component frame of the MR data and a respective imaginary component frame of the MR data. Compiling a layered data set includes stacking the respective real component frames and the respective imaginary component frames. The method uses the layered data set as an input to a convolutional neural network (CNN) having a plurality of residual blocks, wherein the residual blocks incorporate multiple convolution calculations paired with respective skip connections. The method outputs, from the CNN, a de-blurred real image frame and a de-blurred imaginary image frame of the MR data for each complex blurred image.

In yet another embodiment, a non-transitory computer-readable medium stores instructions thereon which, when executed by one or more processors, cause a computer to perform functions for denoising a magnetic resonance (MR) image that include acquiring complex magnetic resonance (MR) image data of an area of interest of a subject, wherein the image data comprises complex blurred images of multi-coil MR image data, and wherein the complex blurred images comprise resonant image data and off-resonance artifact data. The instructions take each of the complex blurred images and cause the computer to perform functions that include a computer-implemented method of denoising a magnetic resonance (MR) image. The first step of the method includes acquiring complex magnetic resonance (MR) image data of an area of interest of a subject, wherein the image data includes complex blurred images of multi-coil MR image data, and wherein the complex blurred images include resonant image data and off-resonance artifact data. For each of the complex blurred images, the method includes demodulating the complex blurred images at a selected number (n) of frequencies to form, for each of the n frequencies, a respective real component frame of the MR data and a respective imaginary component frame of the MR data. Compiling a layered data set includes stacking the respective real component frames and the respective imaginary component frames. The method uses the layered data set as an input to a convolutional neural network (CNN) having a plurality of residual blocks, wherein the residual blocks incorporate multiple convolution calculations paired with respective skip connections. The method outputs, from the CNN, a de-blurred real image frame and a de-blurred imaginary image frame of the MR data for each complex blurred image.

Other aspects and features according to the example embodiments of the present disclosure will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

FIG. 7A is a frame of MR image data taken from a subject with minimized noise artifact distortion and used as a ground truth data set in training a neural network to de-blur MR images with off-resonance correction procedures according to this disclosure.

FIG. 7B is a simulated field map of off-resonant frequencies within a selected frequency range that may be used to map a simulated blurred image from the ground truth image of FIG. 7A.

FIG. 7C is a blurred frame of MR image data developed from the ground truth image of FIG. 7A and subject to a simulated k-space trajectory matched to the field map of FIG. 7B, such that the structural similarity metric (SSIM) for the blurred image, compared to the ground truth image of FIG. 7A is equal to 0.7965, and the peak signal to noise ratio (PSNR) for the blurred image, compared to the ground truth image of FIG. 7A, is equal to 27.79.

FIG. 7D is a frame of MR image data that has been de-blurred according to procedures and convolutional neural networks set forth in this disclosure, wherein the de-blurred image is a convolutional neural network output that shows improvements in structural similarity metric (SSIM) at 0.9611 and peak signal to noise ratio (PSNR) at 38.14 as compared to the blurred image of FIG. 7C and when compared to the ground truth image data of FIG. 7A.

FIG. 7E is a frame of MR image data representing the differences in pixel values in image space for the blurred image of FIG. 7C compared to the ground truth image of FIG. 7A.

FIG. 7F is a frame of MR image data representing the differences, which approach zero, in pixel values in image space for the convolutional neural network output of a de-blurred image of FIG. 7D compared to the ground truth image of FIG. 7A.

FIG. 8A illustrates an overall frame of blurred MR image data and a close up section of the frame of image data, wherein the image corresponds to a spiral scan of a standardized phantom object used to test and calibrate the off-resonance correction methods implemented in this disclosure.

FIG. 8B illustrates an overall frame of corrected MR image data and a close up section of the frame of corrected MR image data, wherein the image corresponds to the standardized phantom object of FIG. 8A used to test and calibrate the off-resonance correction methods implemented in this disclosure and has been corrected with off-resonant de-blurring techniques disclosed herein.

FIG. 8C illustrates an overall frame of corrected MR image data and a close up section of the frame of corrected MR image data, wherein the image corresponds to a standardized phantom object used to test and calibrate the off-resonance correction methods implemented in this disclosure and has been corrected with a semi-automated off-resonant de-blurring techniques that also use a low resolution field map for additional correction in a semi-automatic system.

FIG. 9A illustrates an overall frame of blurred MR image data and a close-up section of the frame of image data, wherein the image corresponds to a head image of a human using a spiral scan with SPAMM (SPAtial Modulation of Magnetization) which is a technique where RF-saturation pulses are used to place stripes or grids on the image for tagging to aid visualization of the blurring.

FIG. 9B illustrates an overall frame of corrected MR image data and a close up section of the frame of corrected MR image data using the CNN of this disclosure, wherein the the image corresponds to a head image of a human using a spiral scan with SPAMM (SPAtial Modulation of Magnetization) which is a technique where RF-saturation pulses are used to place stripes or grids on the image for tagging to aid visualization of the blurring.

FIG. 9C illustrates an overall frame of corrected MR image data and a close up section of the frame of corrected MR image data, wherein the image corresponds to a head image of a human using a spiral scan with SPAMM (SPAtial Modulation of Magnetization) which is a technique where RF-saturation pulses are used to place stripes or grids on the image for tagging to aid visualization of the blurring. The image has been corrected with a semi-automated off-resonant de-blurring techniques that also use a low resolution field map for additional correction in a semi-automatic system.

DETAILED DESCRIPTION

Figure 1:
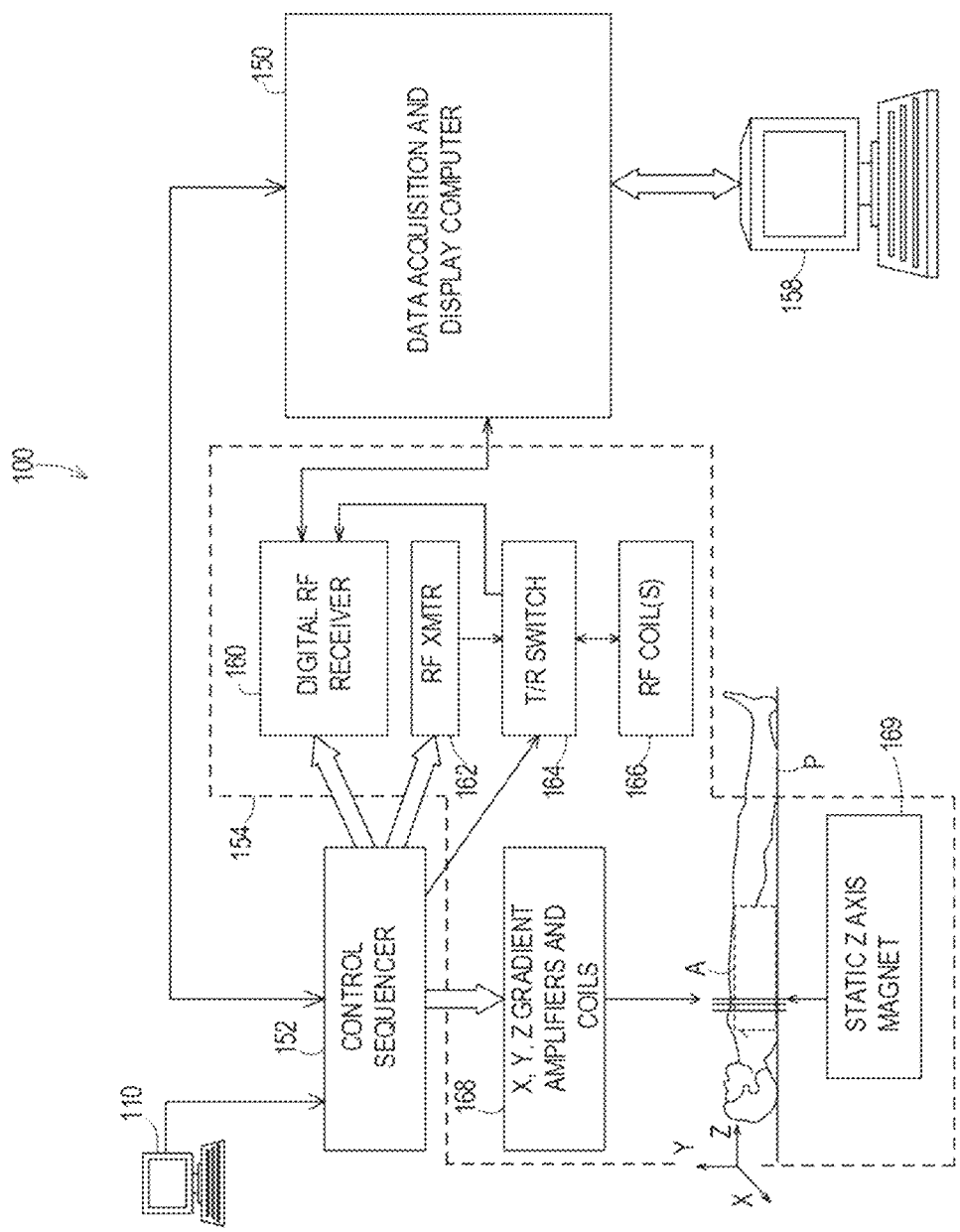
FIG. 1 is a system diagram illustrating an operating environment capable of implementing aspects of the present disclosure.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a "subject" (or "patient") may be any applicable human, animal, or other organism, living or dead, or other biological or molecular structure or chemical environment, and may relate to particular components of the subject, for instance specific organs, tissues, or fluids of a subject, may be in a particular location of the subject, referred to herein as an "area of interest" or a "region of interest."

Some references, which may include various patents, patent applications, and publications, are cited in reference lists and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. For example, "[3]" refers to the $3^{rd}$ reference in the list, namely Zhang, K., Zuo, W., Chen, Y., Meng, D., Zhang, L.: Beyond a Gaussian Denoiser: Residual Learning of Deep CNN for Image Denoising. IEEE Transactions on Image Processing. 26, 3142-3155 (2017). All references cited and discussed in this specification are incorporated herein by reference in their entireties and to the same extent as if each reference was individually incorporated by reference.

A detailed description of aspects of the present disclosure, in accordance with various example embodiments, will now be provided with reference to the accompanying drawings. The drawings form a part hereof and show, by way of illustration, specific embodiments and examples. In referring to the drawings, like numerals represent like elements throughout the several figures. Some experimental data are presented herein for purposes of illustration and should not be construed as limiting the scope of the present disclosure in any way or excluding any alternative or additional embodiments.

Reference [15] below (Zbontar et al., 2019) offers a comprehensive overview of MR imaging. The Zbontar reference [9B] is incorporated by reference herein. Zbontar explains how a fastMRI dataset, which is a collection of both raw MR measurements and images collected from clinicians, is available for research purposes. The research supporting this disclosure has utilized such a database to create, train, test and use the de-blurring techniques described herein.

Zbontar includes a useful overview of MR imaging and states "[d]uring imaging, a sequence of spatially and temporally varying magnetic fields, called a pulse sequence, is applied by the MRI machine. This induces the body to emit resonant electromagnetic response fields which are measured by the receiver coil. The measurements typically correspond to points along a prescribed path through the multi-dimensional Fourier-space representation of an imaged body. This Fourier space is known as k-space in the medical imaging community. In the most basic usage of MR imaging, the full Fourier-space representation of a region is captured by a sequence of samples that tile the space up to a specified maximum frequency. The spatially-resolved image m can be estimated from the full k-space y by performing an inverse multidimensional Fourier transform." Zbontar, ref. [15], pages 2-3. The fastMRI Dataset referenced in the Zbontar reference [15] includes vast collections of this kind of MR image data for research use. Zbontar explains that the data can be used for MRI single-coil and multi-coil reconstructions. As their name implies these kinds of reconstructions can approximate a respective ground truth image from under-sampled single coil data or under-sampled multi-coil data, where under-sampling helps with processing times. According to Zbontar, ground truth images are "real-valued images reconstructed from fully-sampled multi-coil acquisitions." Zbontar, page 6. These aspects of the Zbontar reference [15] are utilized further herein and are provided as a brief introduction to the subject matter of this disclosure.

Additional background information is provided in FIGS. 1-4. FIG. 1 is a system diagram illustrating an operating environment capable of implementing aspects of the present disclosure in accordance with one or more example embodiments. FIG. 1 illustrates an example of a magnetic resonance imaging (MRI) system 100, including a data acquisition and display computer 150 coupled to an operator console 110, an MRI real-time control sequencer 152, and an MRI subsystem 154. The MRI subsystem 154 may include XYZ magnetic gradient coils and associated amplifiers 168, a static Z-axis magnet 169, a digital RF transmitter 162, a digital RF receiver 160, a transmit/receive switch 164, and RF coil(s) 166. The MRI subsystem 154 may be controlled in real time by control sequencer 152 to generate magnetic and radio frequency fields that stimulate magnetic resonance phenomena in a living subject, patient P, to be imaged. A contrast-enhanced image of an area of interest A of the patient P may be shown on display 158. The display 158 may be implemented through a variety of output interfaces, including a monitor, printer, or data storage.

The area of interest "A" corresponds to a region associated with one or more physiological activities in patient "P". The area of interest shown in the example embodiment of FIG. 1 corresponds to a chest region of patient "P", but the area of interest for purposes of implementing aspects of the disclosure presented herein is not limited to the chest area. It should be recognized and appreciated that the area of interest can be one or more of a brain region, heart region, and upper or lower limb regions of the patient "P", for example.

It should be appreciated that any number and type of computer-based medical imaging systems or components, including various types of commercially available medical imaging systems and components, may be used to practice certain aspects of the present disclosure. Systems as described herein with respect to example embodiments are not intended to be specifically limited to magnetic resonance imaging (MRI) implementations or the particular system shown in FIG. 1.

One or more data acquisition or data collection steps as described herein in accordance with one or more embodiments may include acquiring, collecting, receiving, or otherwise obtaining data such as imaging data corresponding to an area of interest. By way of example, data acquisition or collection may include acquiring data via a data acquisition device, receiving data from an on-site or off-site data acquisition device or from another data collection, storage, or processing device. Similarly, data acquisition or data collection devices of a system in accordance with one or more embodiments of the present disclosure may include any device configured to acquire, collect, or otherwise obtain data, or to receive data from a data acquisition device within the system, an independent data acquisition device located on-site or off-site, or another data collection, storage, or processing device.

Figure 2:
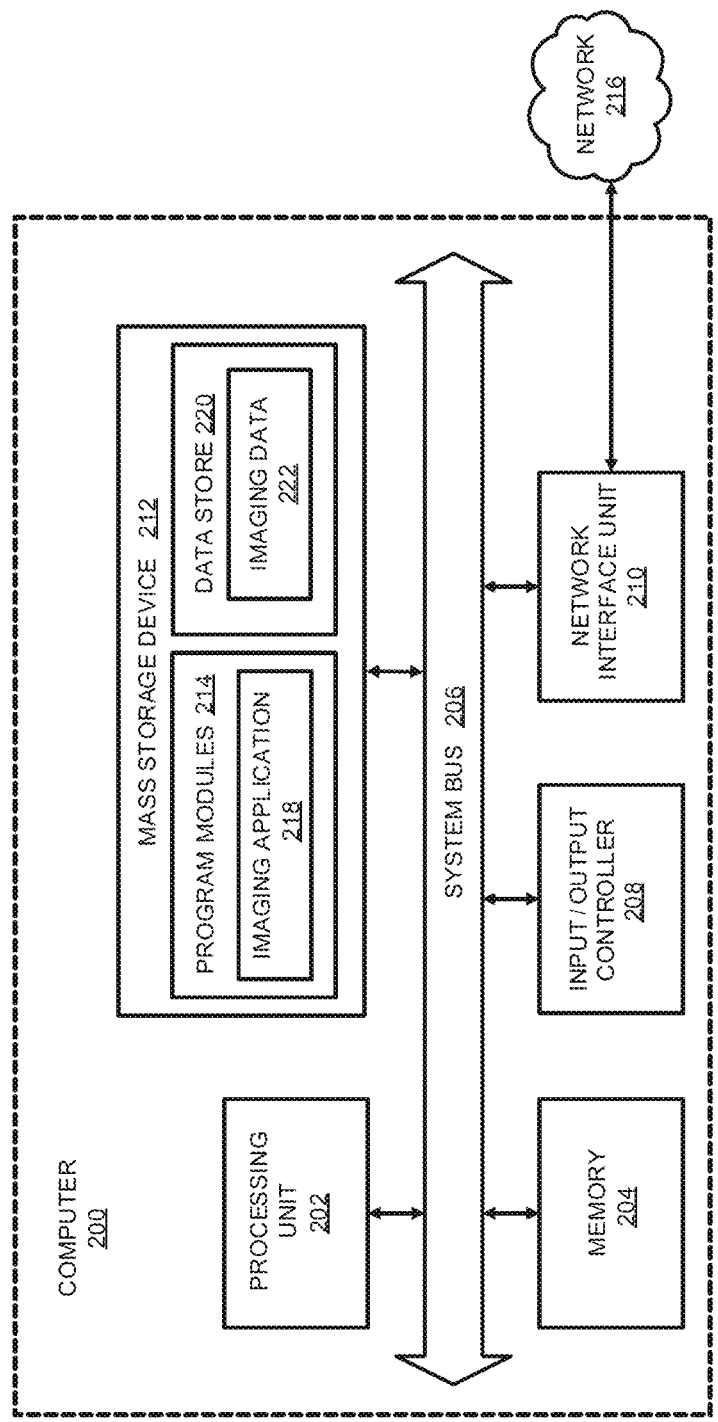
FIG. 2 is a computer architecture diagram showing a general computing system capable of implementing aspects of the present disclosure.

FIG. 2 is a computer architecture diagram showing a general computing system capable of implementing aspects of the present disclosure in accordance with one or more embodiments described herein. A computer 200 may be configured to perform one or more functions associated with embodiments of this disclosure. For example, the computer 200 may be configured to perform operations for denoising MR images as described herein with respect to certain embodiments. It should be appreciated that the computer 200 may be implemented within a single computing device or a computing system formed with multiple connected computing devices. The computer 200 may be configured to perform various distributed computing tasks, which may distribute processing and/or storage resources among the multiple devices. The data acquisition and display computer 150 and/or operator console 110 of the system shown in FIG. 1 may include one or more systems and components of the computer 200.

As shown, the computer 200 includes a processing unit 202 ("CPU"), a system memory 204, and a system bus 206 that couples the memory 204 to the CPU 202. The computer 200 further includes a mass storage device 212 for storing program modules 214. The program modules 214 may be operable to perform one or more functions associated with embodiments of method as illustrated in one or more of the figures of this disclosure, for example to cause the computer 200 to perform operations of the present disclosure as described below. The program modules 214 may include an imaging application 218 for performing data acquisition functions as described herein, for example to receive image data corresponding to magnetic resonance imaging of an area of interest. The computer 200 can include a data store 220 for storing data that may include imaging-related data 222 such as acquired image data, and a modeling data store 224 for storing image modeling data, or other various types of data utilized in practicing aspects of the present disclosure.

The mass storage device 212 is connected to the CPU 202 through a mass storage controller (not shown) connected to the bus 206. The mass storage device 212 and its associated computer-storage media provide non-volatile storage for the computer 200. Although the description of computer-storage media contained herein refers to a mass storage device, such as a hard disk or CD-ROM drive, it should be appreciated by those skilled in the art that computer-storage media can be any available computer storage media that can be accessed by the computer 200.

By way of example, and not limitation, computer-storage media (also referred to herein as a "computer-readable storage medium" or "computer-readable storage media") may include volatile and non-volatile, removable and non-removable media implemented in any method or technology for storage of information such as computer-storage instructions, data structures, program modules, or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 200. Transitory signals are not "computer-storage media", "computer-readable storage medium" or "computer-readable storage media" as described herein.

According to various embodiments, the computer 200 may operate in a networked environment using connections to other local or remote computers through a network 216 via a network interface unit 210 connected to the bus 206. The network interface unit 210 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 200 may also include an input/output controller 208 for receiving and processing input from a number of input devices. Input devices may include one or more of keyboards, mice, stylus, touchscreens, microphones, audio capturing devices, or image/video capturing devices. An end user may utilize such input devices to interact with a user interface, for example a graphical user interface, for managing various functions performed by the computer 200.

The bus 206 may enable the processing unit 202 to read code and/or data to/from the mass storage device 212 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state or may include rotating media storing magnetically-encoded information. The program modules 214, which include the imaging application 218, may include instructions that, when loaded into the processing unit 202 and executed, cause the computer 200 to provide functions associated with embodiments illustrated herein. The program modules 214 may also provide various tools or techniques by which the computer 200 may participate within the overall systems or operating environments using the components, flows, and data structures discussed throughout this description.

In general, the program modules 214 may, when loaded into the processing unit 202 and executed, transform the processing unit 202 and the overall computer 200 from a general-purpose computing system into a special-purpose computing system. The processing unit 202 may be constructed from any number of transistors or other discrete circuit elements, which may individually or collectively assume any number of states. More specifically, the processing unit 202 may operate as a finite-state machine, in response to executable instructions contained within the program modules 214. These computer-executable instructions may transform the processing unit 202 by specifying how the processing unit 202 transitions between states, thereby transforming the transistors or other discrete hardware elements constituting the processing unit 202.

Encoding the program modules 214 may also transform the physical structure of the computer-storage media. The specific transformation of physical structure may depend on various factors, in different implementations of this description. Examples of such factors may include but are not limited to the technology used to implement the computer-storage media, whether the computer storage media are characterized as primary or secondary storage, and the like. For example, if the computer-storage media are implemented as semiconductor-based memory, the program modules 214 may transform the physical state of the semiconductor memory, when the software is encoded therein. For example, the program modules 214 may transform the state of transistors, capacitors, or other discrete circuit elements constituting the semiconductor memory.

As another example, the computer-storage media may be implemented using magnetic or optical technology. In such implementations, the program modules 214 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Commercially available medical imaging systems and components, may be used to practice certain aspects of the present disclosure. These commercially available imaging systems include 1.5 T and 3 T MRI scanners.

Figure 3A:
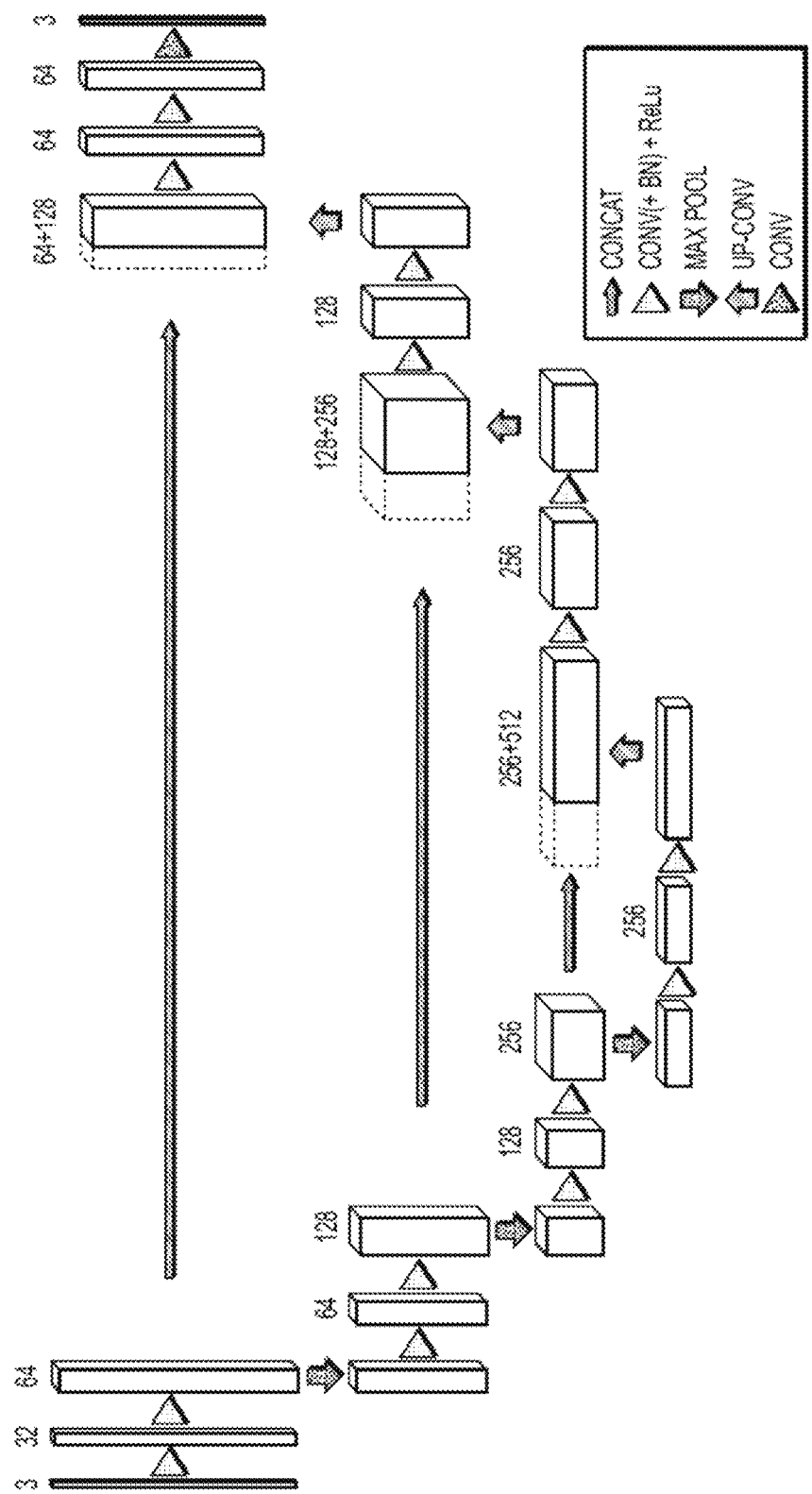
FIG. 3A is a PRIOR ART schematic that illustrates a conventional U-Net.

FIG. 3A has been used previously in U.S. Pat. Pub. No. 2022/0188602 (Meyer), which is incorporated by reference in its entirety. With reference to background FIG. 3A, a schematic of a U-Net convolutional neural network is shown. The boxes represent feature maps, and the number of channels is labelled on each feature map. Neural network operations set forth in the legend of FIG. 3A, including convolution and max pooling, are represented by arrows between each feature map.

Some embodiments of the present disclosure may also include an Unsupervised Deep Convolutional Neural Network (U-DCNN) with structural improvements specifically for denoising MRIs. Some embodiments of the present disclosure only require a noisy MRI to be denoised as the input and functions as a traditional filter so that no simulated or acquired high-quality training data is needed. Instead of relying on averaging, the U-DCNN* uses a DCNN structure and therefore is more robust in denoising performances and maintaining fine structures, especially for non-uniform noise in a clinical MR image. Embodiments of the present disclosure include different network designs with a variety of input images, network depths, and skip-connections.

The structure and hyper-parameters of the U-DCNN can be optimized for brain MRI. Embodiments of the present disclosure have been validated with a simulated brain MRI dataset at various noise levels and an acquired dataset with parallel imaging. Comparisons with non-local means (NLM) and block-matching and 3D filtering (BM3D) were made, demonstrating a superior and more robust performance over the traditional filter-based methods, especially on the acquired MRI with non-uniform noise.

According to some embodiments of the present disclosure, the U-DCNN is a deep generator network, which can be regarded as a highly non-linear parametric function $x=f_\theta(z)$ that maps an input z to a denoised image x. The parameters $\theta$ can be comprised of the weights and bias of the network's filtering operations including convolutions, up-sampling and non-linear activation functions. The final set of parameters can be obtained using an optimizer such as gradient descent and a loss function, starting from a random parameter initialization. As discussed in [4], such a network structure has high impedance to noise and low impedance to signal. In other words, when generating x, it is much easier to obtain the parameter set for an image than random noise, as the patterns in an image can make the generation process more convenient. For natural images, U-DCNN 600 has demonstrated a faster convergence towards naturally-looking images than corrupted noisy images [4].

The denoising performance can be different between MRI and natural images because: 1) MRI has different image characteristics, 2) the fine structural details, such as small lesions, matter more in MRI, and 3) MRI noise is usually more complex than the uniform Gaussian noise on natural images, especially with multiple receiver coils. In order to study the denoising capability of U-DCNN on MRI, the generation process for the synthetic noise-free brain MRI, Rician noise itself and noisy MRI using the mean squared error (MSE) between the output of U-DCNN and the specific target was examined.

According to some embodiments of the present disclosure, the method for denoising images includes acquiring MR image data 160 of the area of interest A of the subject P and processing that data using a U-DCNN to remove the noise. The area of interest A may include at least a part of the brain of the subject P or patient. Embodiments of the present disclosure may be used to denoise images produced by magnetic resonance angiography, diffusion MRI, perfusion MRI, or other medical imaging techniques. The noise data can comprise non-uniform noise originating from coils 168 used in multi-band MR image acquisitions. The noisy input images input to the system can be previously calculated as diagnostic compilations of acquired image data from parallel channels, and the diagnostic compilations can include calculated images showing the subject P or patient's apparent diffusion coefficient, cerebral blood flow and cerebral blood volume. The high SNR image data can include MR image data 160 acquired during different MRI sequences, including the T1, T2, and PD sequences.

Noisy input images can include noise data and noise-free image data. According to some embodiments of the present disclosure, the noisy input images are processed by running iterations of a converging sequence in the U-DCNN, and updating the parameter settings used in calculating a series of image feature sets with the U-DCNN. The parameter settings can be updated in each iteration of the converging sequence. The converging sequence of the U-DCNN can be terminated before the feature sets predict an output image that replicates the noise data from the noisy input image. According to some embodiments of the present disclosure, a denoised MR image of the area of interest A can be output based on the selected features set.

Embodiments of the present disclosure may be applied to 2D images, 3D images, or both. Embodiments of the present disclosure applied to 3D images can use the additional spatial information from the through-plane dimension that is not present in a 2D image. The acquired MR image data 160 may include multi-slice or 3D acquisition. For example, a slice-wise sliding window technique using 3D convolutions can be used. For brain MRI with multi-slice 2D or 3D acquisitions, the spatial information along the through-plane dimension can be integrated to improve the performance [16]. Replacing the 2D convolutions with 3D convolutions in the unsupervised DCNN can change it to a 3D network. According to some embodiments of the present disclosure, the network can take the entire 3D stack as an input. However, according to some embodiments of the present disclosure, a slice-wise sliding window can be used by reconstructing a small number of slices (e.g. 8) together and sliding to the next stack when one stack finishes denoising. Using a slice-wise sliding window method can avoid the greatly increased computation and memory requirements of a network that takes the entire 3D stack as a single input. The network structure on the slice dimension will also be greatly simplified to limit the extra computations. To further accelerate the algorithm, which will become more of a bottleneck when there are a large number of slices in one scan, ShuffleNet [17] can be used. ShuffleNet divides the convolutions along the feature dimension into smaller groups and performs a two-step process to first run convolutions within groups and then summarizes the output from different groups. ShuffleNet has shown advantages in computation speed with minimal or no loss of accuracy.

As the unsupervised DCNN is used for denoising, the requirement for collecting a large dataset for training and validation is alleviated. However, a decent-sized validation dataset that uses a variety of sequences and acquisition strategies is still necessary. To evaluate the algorithm against a noise-free gold standard and compare with other methods, an open source simulated brain database (BrainWeb) [34A-38A] that includes T1, T2 and PD weighted images at a variety of slice thicknesses, noise levels, and levels of intensity non-uniformity may be used. It also includes both a normal brain and a brain with MS lesions.

Figure 3B:
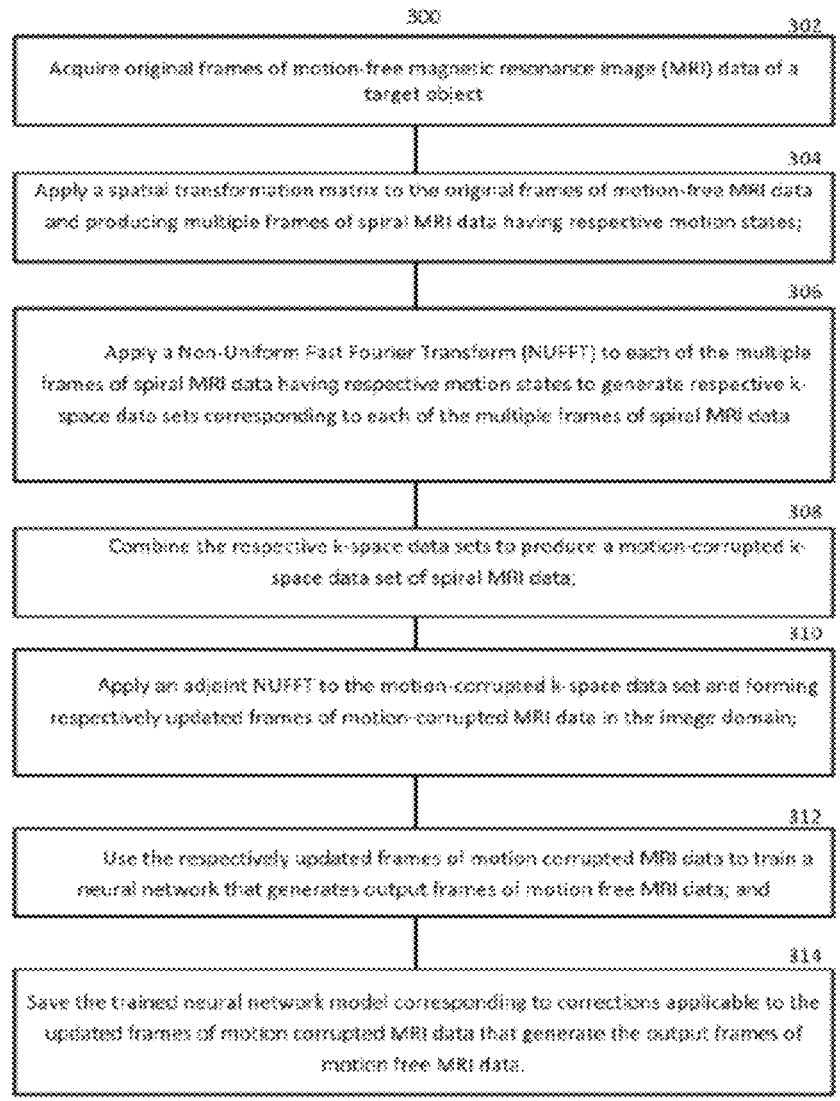
FIG. 3B is a PRIOR ART flow chart of a method of using a Non-Uniform Fast Fourier Transform (NUFFT) on MRI images in accordance with embodiments of this disclosure.

FIG. 3B has been used previously in U.S. Pat. Pub. No. 2022/0373630 (Dou), which is incorporated by reference in its entirety. With reference to FIG. 3B, a method 300 for training a neural network to correct motion-induced artifacts in magnetic resonance images is shown.

At step 302, the method can include acquiring original spirally-sampled frames of motion-free magnetic resonance image (MRI) data of a target object. The images can be images that were acquired using any method, including using both conventional MRI sampling and spiral MIR sampling.

In some embodiments of the present disclosure, the method 300 can also include augmenting the original frames of motion free MRI data to form augmented frames of motion free MRI data in the image domain. The augmentation can include applying different transforms to the original frames. Non-limiting examples of transforms that can be applied in embodiments of the present disclosure include applying in-plane rotations, horizontal flips, and/or vertical flips to the original frames. In some embodiments of the present disclosure, the augmented frames of motion-free MRI data and the respectively updated frames of motion-corrupted MRI data can be saved in a computer. As a non-limiting example, the augmented frames and the respectively updated frames can be saved in the image domain format.

At step 304, a spatial transformation matrix can be applied to the original frames of the motion-free MRI data to produce multiple frames of spiral MRI data having respective motion states.

At step 306, a non-uniform Fast Fourier Transform (NUFFT) can be applied to each of the multiple frames of spiral MRI data having respective motion states to generate respective k-space data sets corresponding to each of the multiple frames of spiral MRI data having respective motion states.

At step 308, the respective k-space data sets can be combined. The combination of the respective K-space datasets can produce a motion-corrupted k-space data set of spiral MRI data.

At step 310, an adjoint NUFFT can be applied to the motion-corrupted k-space data set and respectively updated frames of motion-corrupted MRI data in the image domain can be formed.

At step 312, a neural network can be trained that generates output frames of motion free MRI data using the respectively updated frames of motion corrupted MRI data. In some embodiments of the present disclosure, step 312 can include training a generative adversarial network with augmented frames of motion-free MRI data and the respectively updated frames of motion-corrupted MRI data. As a non-limiting example, training the generative adversarial network can include applying the respectively updated frames of motion-corrupted MRI data to a generator in the generative adversarial network to produce respective motion compensated images accessible by a discriminator in the generative adversarial network. In some embodiments of the present disclosure, training the generative adversarial network can also include applying the respectively updated frames of motion-corrupted MRI data and the respective motion compensated images to a discriminator within the generative adversarial network.

In some embodiments of the present disclosure, the generative adversarial network can be trained by applying the respectively updated frames of motion-corrupted MRI data and a target motion-free image to a discriminator within the generative adversarial network. The generative adversarial network that can be trained in step 312 can also be trained to minimize or maximize a function, for example a function related to image quality. As a non-limiting example the function can be an error function and the system can be configured to minimize the error function. A non-limiting example of an error function is a function that represents the amount of error in the output images.

At step 314, the trained neural network model can be saved. The trained neural network model can correspond to corrections applicable to the updated frames of motion corrupted MRI data that generate the output frames of motion-free MRI data.

FIG. 3B illustrates another method 350 according to an embodiment of the present disclosure. The method 350 can train a neural network to correct motion-induced errors in magnetic resonance images.

At step 352 original frames of motion-free magnetic resonance image (MRI) data of a target object can be acquired.

At step 354, spiral interleaves for spatial transformation can be selected for each original frame of motion-free MRI data, and a respective spatial transformation matrix is applied to the selected spiral interleaves therein to produce multiple frames of spiral MRI data having respective motion states.

In some embodiments of the present disclosure, step 354 can include selecting spiral interleaves for spatial transformation by dividing all spiral interleaves within the original frames into a selected number of sets, wherein each set is subject to a respective motion event corresponding to a respective spatial transformation matrix.

In some embodiments of the present disclosure, applying the spatial transformation can include simulating in plane rigid motion artifacts from the original frames to produce the multiple frames of spiral MRI data having respective motion states.

In some embodiments of the present disclosure, the number of spiral interleaves in a set can randomly selected from {8, 16, 32, 64, 128}. Additionally, in some embodiments, the spatial transformation of the spiral interleaves can include a type of spiral trajectory randomly selected from constant density, variable density, and dual density transformations.

At step 356, a Non-uniform Fast Fourier Transform (NUFFT) can be applied to each of the multiple frames of spiral MRI data having respective motion states to generate respective k-space data sets corresponding to each of the multiple frames of spiral MRI data having respective motion states;

At step 358, the respective k-space data sets are combined to produce a motion-corrupted k-space data set of spiral MRI data.

At step 360, an adjoint NUFFT can be applied to the motion-corrupted k-space data set and respectively updated frames are formed of motion-corrupted MRI data in the image domain. In some embodiments of the present disclosure, forming the multiple frames of spiral MRI data having respective motion states can include applying in-plane horizontal and vertical translations and/or in plane rotations to the original frames of motion free MRI data.

At step 362, a neural network can be trained that generates output frames of motion free MRI data using the respectively updated frames of motion corrupted MRI data that generate the output frames of motion free MRI data. At step 364, data can be saved corresponding to corrections applicable to the updated frames of motion corrupted MRI data to generate the output frames of motion free MRI data.

Some methods of MR image data correction include a computer-implemented method of training a neural network to correct motion-induced errors in magnetic resonance images by acquiring original frames of motion free magnetic resonance image (MRI) data of a target object. Fourier transforms are used to acquire respective original k-space data sets corresponding to each original frame. The method continues by applying a respective spatial transformation matrix to each original k-space data set to acquire motion state data for each original k-space data set. The computer then replaces portions of each original k-space data set with the motion state data to produce a transformed k-space MRI data set having a respective motion state and by combining the transformed k-space MRI data sets, the method produces a motion-corrupted k-space data set of MRI data. To return back to the image domain, the method includes applying an inverse Fourier transform to the motion-corrupted k-space data set and forming respective synthetic motion corrupted frames of MRI data. The synthetic motion corrupted frames of MRI data are used to train a neural network that generates output frames of motion compensated MRI data. Applying the spatial transformation matrix includes simulating in plane rigid motion artifacts from the original frames to produce the multiple frames of MRI data having the respective motion states. In some non-limiting embodiments, the Fourier transform is a Fast Fourier Transform and the k-space data sets are Cartesian k-space data sets.

In other related systems, the Fourier transform is a Non-Uniform Fourier Transform and the k-space data sets are formed on spiral k-space trajectories. Replacing portions of each original k-space data set further includes replacing selected spiral interleaves in a respective k-space data set. Replacing selected spiral interleaves may include dividing all spiral interleaves in the motion-corrupted k-space data set into a selected number of sets, wherein each set is subject to a respective motion event corresponding to a respective spatial transformation matrix. In non-limiting embodiments, a number of spiral interleaves in each of the sets is randomly selected from a group of numbers including 8, 16, 32, 64, and 128. A spatial transformation of the spiral interleaves may include a type of spiral trajectory randomly selected from constant density, variable density, and dual density transformations. The number of sets is selected from 1, 2, 3, and 4 sets.

In addition to the above noted use of convolutional neural networks, this disclosure includes using more advanced networks, particularly de-noising convolutional neural networks as set forth in reference [23], which is incorporated herein by reference in its entirety. In the article of reference [23], Zhang et al. ("Zhang") describes advances in de-noising convolutional neural networks with residual layer predictions. Zhang uses feed-forward, denoising convolutional neural networks (DnCNNs) to embrace the progress in very deep architecture, learning algorithms, and regularization methods for image denoising. The DnCNN model of reference [23] is able to handle Gaussian denoising with unknown noise levels (i.e., blind Gaussian denoising) and even additive white Gaussian noise (AWGN).

Over the last few decades, various models have been exploited for modeling image priors in the context of de-noising algorithms, including nonlocal self-similarity (NSS) models. To overcome the limitations of prior-based approaches, several discriminative learning methods have been recently developed to learn image prior models in the context of truncated inference procedure. In Zhang's work of reference [23], instead of learning a discriminative model with an explicit image prior, Zhang treats image denoising as a plain discriminative learning problem, i.e., separating the noise from a noisy image by feed-forward convolutional neural networks (CNN). Zhang explains, at page 1, the reasons for using CNN as being "three-fold." "First, CNN with very deep architecture is effective in increasing the capacity and flexibility for exploiting image characteristics. Second, considerable advances have been achieved on regularization and learning methods for training CNN, including Rectifier Linear Unit (ReLU), batch normalization and residual learning. These methods can be adopted in CNN to speed up the training process and improve the denoising performance. Third, CNN is well-suited for parallel computation on modern powerful GPU, which can be exploited to improve the run time performance. Rather than directly outputting the denoised image ˆx, the proposed DnCNN is designed to predict the residual image ˆv, i.e., the difference between the noisy observation and the latent clean image. The proposed DnCNN implicitly removes the latent clean image with the operations in the hidden layers." See reference [23], Zhang, page 2.

Zhang contrasts "the existing deep neural network-based methods which directly estimate the latent clean image with the Zhang network that adopts the residual learning strategy to remove the latent clean image from noisy observation. The residual network explicitly learns a residual mapping for a few stacked layers. With such a residual learning strategy, extremely deep CNN can be easily trained and improved accuracy has been achieved for image classification and object detection." Ref. [23], Zhang page 2.

Figure 4:
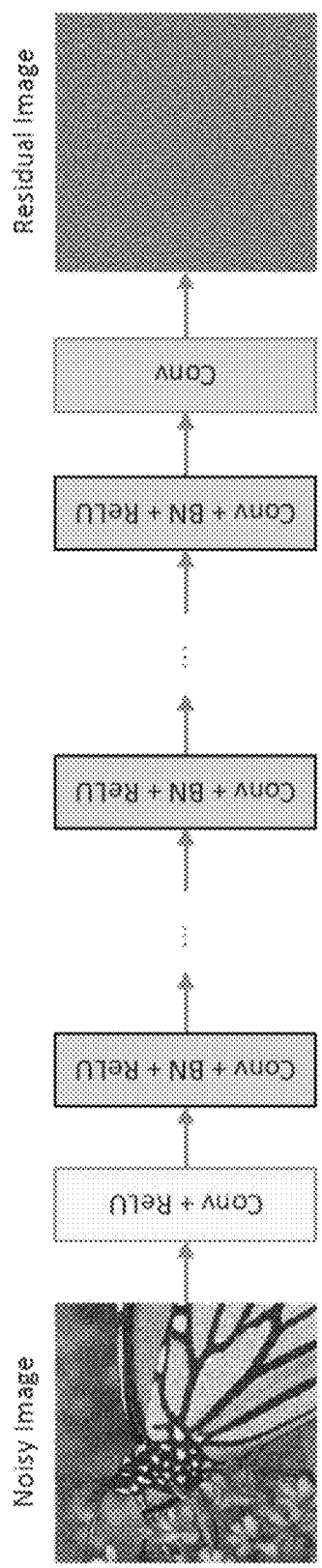
FIG. 4 is a PRIOR ART schematic that illustrates a de-noising convolutional neural network DnCNN.

FIG. 4 is a schematic of Zhang's network, which also shows that "batch normalization is proposed to alleviate the internal covariate shift by incorporating a normalization step and a scale and shift step before the nonlinearity in each layer. For batch normalization, only two parameters per activation are added, and they can be updated with back-propagation." Reference [23], Zhang page 3. Zhang describes the deep architecture of FIG. 4 as a "DnCNN with depth D, [and] three types of layers . . . . (i) Conv+ReLU: for the first layer, 64 filters of size 3×3×c are used to generate 64 feature maps, and rectified linear units (ReLU, max(0; ●)) are then utilized for nonlinearity. Here c represents the number of image channels, i.e., c=1 for gray image and c=3 for color image. (ii) Conv+BN+ReLU: for layers 2~(D−1), 64 filters of size 3×3×64 are used, and batch normalization is added between convolution and ReLU. (iii) Cony: for the last layer, c filters of size 3×3×64 are used to reconstruct the output." Ref. [23], Zhang, page 5.

One non-limiting goal of this disclosure is to utilize the above concepts, particularly the de-noising convolutional neural networks, but to also include calculations of complex image data that includes phase information, instead of simply relying upon magnitude data or other real numeric data that represents an image. This process not only requires adjustments for the kind of data, but certain steps in the process, such as batch normalization and rectified linear units, are also adjusted as part of this disclosure.

The advancements in complex neural networks has also required advancements in certain steps such as the rectified linear units used therein. A rectified linear unit is a process that ensures the image data remains positive during convolutions. The ReLU outputs the same value for a positive input and a zero for a negative input to expedite calculations during use of convolutional neural network. This disclosure quotes portions of reference [24] by Trabelsi, et al. ("Trabelsi") for clarity in certain processes, including the ReLU application in a complex domain. Trabelsi, page 2, indicates "the advantages of using complex-valued representations with respect to retrieval and insertion into an associative memory. In residual networks, the output of each block is added to the output history accumulated by summation until that point." Trabelsi notes that the work in reference [24] "incorporate[s] complex weights and activations in residual networks."

Trabelsi indicates that "the phase component is not only important from a biological point of view but also from a signal processing perspective. It has been shown that the phase information in speech signals affects their intelligibility (Shi et al., 2006). Also Oppenheim and Lim (1981) show that the amount of information present in the phase of an image is sufficient to recover the majority of the information encoded in its magnitude. In fact, phase provides a detailed description of objects as it encodes shapes, edges, and orientations." Going into detail in the complex convolution theory, Trabelsi states that "[i]n order to perform the equivalent of a traditional real-valued 2D convolution in the complex domain, [Trabelsi] convolve[s] a complex filter matrix W=A+iB by a complex vector h=x+iy where A and B are real matrices and x and y are real vectors since this disclosure is simulating complex arithmetic using real-valued entities. As the convolution operator is distributive, convolving the vector h by the filter results in W*h=(A*x−B*y)+i(B*x+A*y)." Trabelsi, page 4. As part of Trabelsi's complex convolution, Trabelsi applies a complex rectified linear unit ("ReLU") on both of the real and imaginary part of a neuron within Trabelsi's system.

This disclosure incorporates by reference the entire disclosures of the above discussed U.S. Pat. Pub. No. 2022/0188602 (Meyer), U.S. Pat. Pub. No. 2022/0373630 (Dou), and the published technical journal articles by Zhang (reference [23]) and Trabelsi (reference [24]). Against the back-drop of these articles and others incorporated by reference below, this disclosure adds significant improvements to all aspects of using de-noising convolutional neural networks (DnCNNs) within the domain of complex data, which would include phase information for collected image data. In general, MR images obtained at low-field inherently have low signal to noise ratios.

Off-resonance is a major limitation for spiral imaging. FIGS. 5-9C illustrate embodiments of this disclosure by which MR image data can be corrected, or de-blurred, by using convolutional neural networks designed to correct off-resonance artifacts present in the images. The off-resonance portions of the image are noisy and incorporate blurred regions or other unwanted distortions in the frame of image data. Prior techniques to account for off-resonant image distortions have included developing complex field maps that track image data within the frames collected at off-resonant frequencies. Simple examples of creating a field map include calculating phase differences between images collected with different echo times. Once the phase differences and frequency offsets in a set of images are known, they can be accounted for by correction algorithms; however, relying upon field maps is complicated because field maps are time and resource intensive to create. This disclosure allows for correcting off resonant image blurring in MRI data collection without relying upon field maps to de-blur the image. This disclosure illustrates a convolutional neural network that was implemented in this study to correct off-resonance artifacts without field maps. The network was trained on images with simulated blurring artifacts. The image quality was improved after the correction for both simulated data and in vivo data.

Spiral data sampling has several advantages, such as short echo time, high scan efficiency, and motion robustness. However, spiral imaging is limited by blurring artifacts raised from off-resonance effects, especially with long readouts. Most existing deblurring methods require prior knowledge about the field map [25-28]. Automatic off-resonance correction methods do not require field maps, but their performance is highly dependent on the choice of the objective function and frequency searching range [29, 30]. Recently, convolutional neural networks (CNNs) demonstrated promising results for image deblurring [31, 32]. This work discloses and develops a convolutional neural network (CNN) to perform automatic off-resonance correction for spiral imaging. An open-source data set (https://fastmri.med.nyu.edu/) containing Cartesian T2-weighted images for 4179 subjects was used. Single-coil data was simulated from the multi-coil data using an emulated single-coil method (p. 2 "using a linear combination of the responses from multiple coils for the emulated single coil (ESC) response").

This work randomly selected 1000 subjects and divided the 1000 imaging volumes such that 750 volumes were used for training and validation, and the remaining 250 volumes were used for testing. To generate paired training data with spiral off-resonance artifacts, a field map was first simulated by combining a random 2D polynomial with several random 2D Gaussian functions. A brain mask was applied to the generated field map to simulate the abrupt off-resonance change at the air-tissue boundary. The frequency range of the simulated field map was limited to between [−500 Hz, +500 Hz]. Then, a spiral k-space trajectory was simulated based on the image field of view (FOV) and resolution, and the corresponding Cartesian k-space time map was calculated for faster computation. The number of spiral interleaves was randomly selected between 4 to 64, and the readout length for one interleave was between 4 ms and 24 ms.

Figure 5:
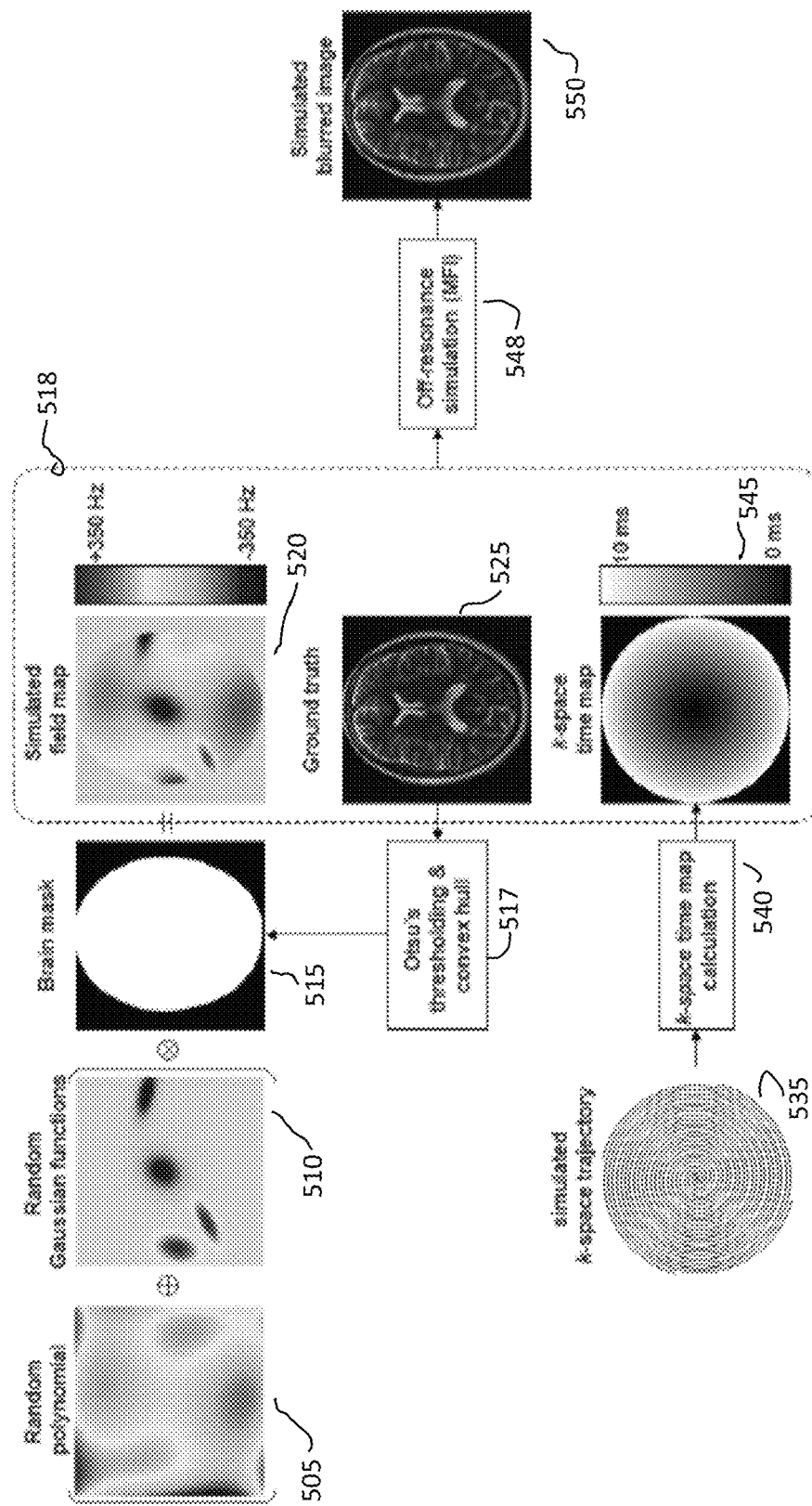
FIG. 5 is a schematic representation of a computerized method of producing blurred MR images to train a neural network according to implementations of this disclosure.
Figure 6:
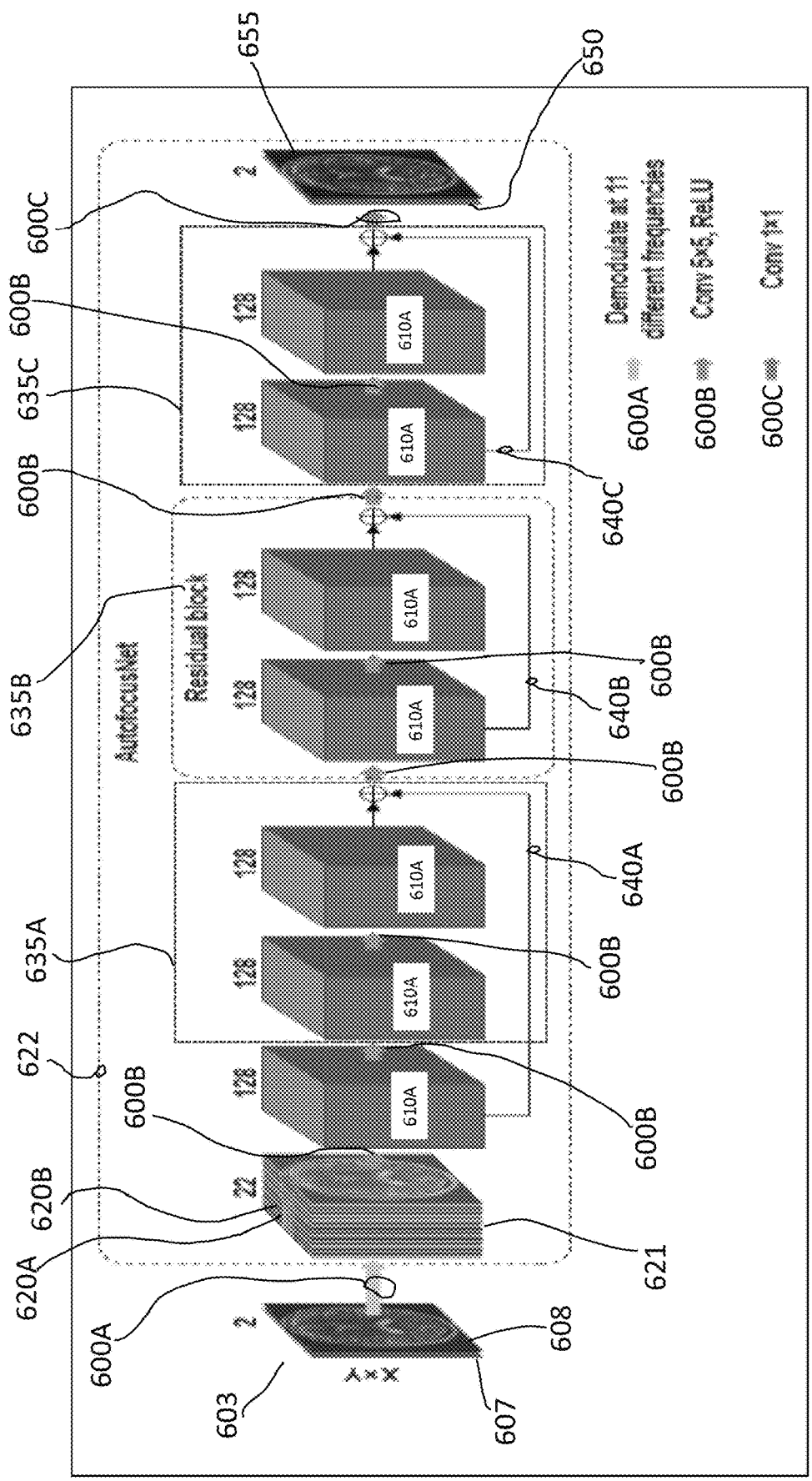
FIG. 6 is a schematic representation of utilizing a convolutional neural network on frames of real and imaginary MR image data to de-blur an MR image according to aspects of this disclosure.

The synthesized blurred image was obtained by applying the simulated field map to the ground truth through multi-frequency interpolation (MFI) [26], as shown in FIG. 5. To correct the off-resonance artifacts, this work explains how to develop and train a CNN with three residual blocks that are collectively labeled in the figures as AutofocusNet. The blurred image was first demodulated at 11 different frequencies, which is also the first step in the conventional autofocus method [29]. The input of the network was a series of the 11 images, with 22 channels corresponding to real and imaginary components. The output was the deblurred image, with 2 channels corresponding to real and imaginary components. Each residual block consists of two 5×5 convolutional layers with filter depths of 128, followed by rectified linear unit (ReLU) activations. A skip connection was added between the block input and output, as shown in FIG. 6. The network was implemented in PyTorch [36]. L1 loss, i.e., the absolute value differences, between the network output and ground truth was optimized using Adam [37] with a learning rate of 0.0001. To avoid overfitting, this disclosure adopted random patch cropping as the training augmentation. The structural similarity index (SSIM) and peak signal-to-noise ratio (PSNR) were calculated as image quality metrics to evaluate the network performance on the simulated dataset. The trained network was also applied to a phantom image and a head image of a healthy volunteer acquired on a Siemens Avanto 1.5T scanner. The spiral imaging parameters were FOV=28 cm$^2$, matrix size=512×512, number of interleaves=14, and readout length=16.4 ms. Semiautomatic correction utilizing a low-resolution field map was also performed for comparison.

FIGS. 7A-7F show the network performance on an image with simulated spiral off-resonance artifacts. Compared to the blurred image, the network output showed less artifacts, sharper structures, and higher image quality. Quantitatively, the average SSIM and PSNR of the simulated dataset were increased from 0.7231 and 26.84 to 0.9365 and 36.71 after off-resonance correction.

The network performance on a phantom image and an in-vivo head image collected with spiral scans were shown in FIGS. 8A-8C and FIGS. 9A-9C respectively. The network effectively recovered the image sharpness and improved the image quality in both cases. These results showed that the network could correct off-resonance artifacts for images outside the training dataset population. The network removed blurring in both situations with an average processing time of 50 ms for a single slice on a single GPU (not including the I/O time). The network can be generalized for concomitant gradient correction.

Considering the FIGS. 5 through 9C in more detail, a computer implemented method of denoising a magnetic resonance (MR) image includes acquiring complex magnetic resonance (MR) image data 525 of an area of interest of a subject, wherein the image data comprises complex blurred images 550 of multi-coil MR image data, and wherein the complex blurred images comprise resonant image data and off-resonance artifact data. For each of the complex blurred images 550, the method includes demodulating 600A the complex blurred images at a selected number (n) of frequencies to form, for each of the n frequencies, a respective real component frame 608 of the MR data and a respective imaginary component frame 607 of the MR data. This disclosure uses layered data sets 603 as inputs to a convolutional neural network operation 622, and the layered data sets 603 are formed by stacking 620A, 620B the respective real component frames 608 and the respective imaginary component frames 607. The layered data set may be used as an input to a convolutional neural network (CNN) having a plurality of residual blocks 635A, 635B, 635C, and the residual blocks may include multiple convolution calculations 600B paired with respective skip connections 640A, 640B, 640C. After a final 1×1 convolution 600C, the output from the CNN is a de-blurred real image frame 655 and a de-blurred imaginary image frame 650 of the MR data for each complex blurred image 603. In some embodiments, the method demodulates the complex blurred images at n=11 frequencies, such that the layered data set is a three dimensional data set having 2n number of channels (22) for use as the input to the CNN operations 622. In some non-limiting examples, compiling the layered data set includes stacking alternating frames of the real component frames 608 and the imaginary component frames 607 for each selected frequency at which a respective complex blurred image has been demodulated.

As shown in FIG. 6, the residual blocks 635A, 635B, 635C may include multiple convolutional calculations 600B, a rectified linear unit activation, and one of the respective skip connections 640A, 640B, 640C. The respective skip connections add a block input to a block output, corresponding to a respective residual block, to provide data continuity between earlier residual blocks and later residual blocks of the CNN. In non-limiting embodiments, the residual blocks 635A, 635B, 635C have two sequential convolutions 610A of the layered data set 621. In some non-limiting embodiments, the CNN may have three consecutive residual blocks of two sequential convolutions. Without limiting this disclosure and illustrated in FIG. 6, the convolutional computations 600B include 5×5 convolution layers with filter depths of 128 followed by rectified linear unit activations. The method of FIG. 6 is particularly adept at minimizing L1 loss (absolute value differences) between an output of the CNN and a ground truth image.

As shown in FIG. 5, this disclosure also includes training the CNN operations 622 with a ground truth image 525 and a simulated blurred image 550 having simulated blurring artifacts by forming the simulated image from an in-vivo ground truth image. In one non-limiting step, the simulated blurred image 550 is created with a brain mask 515 based on the ground truth image 525 to simulate off-resonance changes at an air-tissue interface boundary in the ground truth image. Prior to using the mask, the work includes forming the brain mask 525 by applying thresholding techniques 517 to the ground truth image 525. Using Otsu's thresholding technique and/or a convex hull thresholding technique are non-limiting ways to create the brain mask. The brain mask 517 helps to emphasize the air-tissue interface where clarity in the image can be hard to achieve.

Forming the simulated blurred image includes generating a simulated field map 520 by forming a combination of a random 2D polynomial 505 with at least one random 2D Gaussian function 510 and applying the combination to the brain mask 515. Next, this work generates the simulated blurred image 550 by applying the simulated field map 520 to the ground truth 525 with multifrequency interpolation, wherein the multifrequency interpolation utilizes a simulated k-space trajectory 535 of the ground truth image 525. Random patch cropping and other training augmentations may be incorporated herein for each simulated blurred image. As noted above, the simulated image for training may start with multi-coil data or other techniques include forming the simulated image with emulated single coil data based on the multi-coil data.

The simulated images with the blurring along with paired ground truth images as shown are used to train the convolutional neural networks of this disclosure. The convolutional neural networks with the feed forward arrangement of computations in each residual block are particularly useful in reducing off-resonant blurring in MR images.

One non-limiting theory of operation of the CNN operations 622 lies in the alternating stacked input data 620A, 620B keeping all phase and magnitude information together in the compilations of data. The outputs have shown to be productive as illustrated in FIGS. 7A through 9C.

FIG. 7A is a frame 705 of MR image data taken from a subject with minimized noise artifact distortion and used as a ground truth data set in training a neural network to de-blur MR images with off-resonance correction procedures according to this disclosure.

FIG. 7B is a simulated field map 707 of off-resonant frequencies within a selected frequency range that may be used to map a simulated blurred image 709 from the ground truth image 705 of FIG. 7A.

FIG. 7C is a simulated blurred frame 709 of MR image data developed from the ground truth image 705 of FIG. 7A and subject to a simulated k-space trajectory 535 matched to the field map 707 of FIG. 7B, such that the structural similarity metric (SSIM) for the blurred image, compared to the ground truth image of FIG. 7A is equal to 0.7965, and the peak signal to noise ratio (PSNR) for the blurred image, compared to the ground truth image of FIG. 7A, is equal to 27.79.

FIG. 7D is an output frame 713 of MR image data that has been de-blurred according to procedures and convolutional neural networks set forth in this disclosure, wherein the de-blurred image is a convolutional neural network output that shows improvements in structural similarity metric (SSIM) at 0.9611 and peak signal to noise ratio (PSNR) at 38.14 as compared to the blurred image of FIG. 7C and when compared to the ground truth image data of FIG. 7A.

FIG. 7E is a frame 711 of MR image data representing the differences in pixel values in image space for the blurred image 709 of FIG. 7C compared to the ground truth image 705 of FIG. 7A.

FIG. 7F is a frame 715 of MR image data representing the differences, which approach zero, in pixel values in image space for the convolutional neural network output of a de-blurred image of FIG. 7D compared to the ground truth image of FIG. 7A.

FIG. 8A illustrates an overall frame 805A of blurred MR image data and a close up section 805B of the frame of image data, wherein the image corresponds to a spiral scan of a standardized phantom object used to test and calibrate the off-resonance correction methods implemented in this disclosure.

FIG. 8B illustrates an overall frame 815A of corrected MR image data and a close up section 815B of the frame of corrected MR image data, wherein the image corresponds to the standardized phantom object of FIG. 8A used to test and calibrate the off-resonance correction methods implemented in this disclosure and has been corrected with off-resonant de-blurring techniques disclosed herein.

FIG. 8C illustrates an overall frame 825A of corrected MR image data and a close up section 825B of the frame of corrected MR image data, wherein the image corresponds to a standardized phantom object used to test and calibrate the off-resonance correction methods implemented in this disclosure and has been corrected with a semi-automated off-resonant de-blurring techniques that also use a low resolution field map for additional correction in a semi-automatic system.

FIG. 9A illustrates an overall frame 905A of blurred MR image data and a close-up section 905B of the frame of image data, wherein the image corresponds to a head image of a human using a spiral scan with SPAMM (SPAtial Modulation of Magnetization) which is a technique where RF-saturation pulses are used to place stripes or grids on the image for tagging to aid visualization of the blurring.

FIG. 9B illustrates an overall frame 915A of corrected MR image data and a close up section 915B of the frame of corrected MR image data, wherein the image corresponds to a head image of a human using a spiral scan with SPAMM (SPAtial Modulation of Magnetization) which is a technique where RF-saturation pulses are used to place stripes or grids on the image for tagging to aid visualization of the blurring.

FIG. 9C illustrates an overall frame 925A of corrected MR image data and a close up section 925B of the frame of corrected MR image data, wherein the image corresponds wherein the image corresponds to a head image of a human using a spiral scan with SPAMM (SPAtial Modulation of Magnetization) which is a technique where RF-saturation pulses are used to place stripes or grids on the image for tagging to aid visualization of the blurring. The image has been corrected with a semi-automated off-resonant de-blurring techniques that also use a low resolution field map for additional correction in a semi-automatic system.

CONCLUSION

The specific configurations, choice of materials and the size and shape of various elements can be varied according to particular design specifications or constraints requiring a system or method constructed according to the principles of the present disclosure. Such changes are intended to be embraced within the scope of the present disclosure. The presently disclosed embodiments, therefore, are considered in all respects to be illustrative and not restrictive. The patentable scope of certain embodiments of the present disclosure is indicated by the appended claims, rather than the foregoing description.

The following references are all incorporated by reference into this disclosure as if the text of each is set forth in full.

LIST OF REFERENCES

[1] Haysteen I, Ohlhues A, Madsen K H, et al. Are Movement Artifacts in Magnetic Resonance Imaging a Real Problem?—A Narrative Review. Front Neurol. 2017; 8:232. doi: 10.3389/fneur.2017.00232. PMCID: PMC5447676.

[2] Edwards A D, Arthurs O J. Paediatric MRI under sedation: is it necessary? What is the evidence for the alternatives? Pediatr Radiol. 2011; 41(11):1353-1364. doi: 10.1007/s00247-011-2147-7.

[3] McGibney G, Smith M R, Nichols S T, Crawley A. Quantitative evaluation of several partial Fourier reconstruction algorithms used in MRI. Magn Reson Med. 1993; 30(1):51-59.

[4] Pruessmann K P, Weiger M, Scheidegger M B, Boesiger P. SENSE: sensitivity encoding for fast MRI. Magn Reson Med. 1999; 42(5):952-962.

[5] Griswold M A, Jakob P M, Heidemann R M, et al. Generalized autocalibrating partially parallel acquisitions (GRAPPA). Magn Reson Med. 2002; 47(6):1202-1210.

[6] Lustig M, Pauly J M. SPIRiT: Iterative self-consistent parallel imaging reconstruction from arbitrary k- space. Magn Reson Med. 2010; 64(2):451-471. doi: 10.1002/mrm.22428. PMCID: PMC2925465.

[7] Lustig M, Donoho D, Pauly J M. Sparse MRI: The application of compressed sensing for rapid MR imaging. Magn Reson Med. 2007; 58(6):1182-1195.

[8] Glover G H, Li T Q, Ress D. Image-based method for retrospective correction of physiological motion effects in fMRI: RETROICOR. Magn Reson Med. 2000; 44(1):162-167.

[9] Maclaren J, Herbst M, Speck O, Zaitsev M. Prospective motion correction in brain imaging: a review. Magn Reson Med. 2013; 69(3):621-636. doi: 10.1002/mrm.24314.

[10] Buades, A., Coll, B., Morel, J.-M.: Non-Local Means Denoising. Image Processing On Line. 1, (2011).

[11] Dabov, K., Foi, A., Katkovnik, V., Egiazarian, K.: Image denoising with block-matching and 3D filtering. Image Processing: Algorithms and Systems, Neural Networks, and Machine Learning. (2006).

[12] cicek, Ozgun et al., 3D U-Net: Learning Dense Volumetric Segmentation from Sparse Annotation published in MICCAI 2016.

[13] Zhang, K., Zuo, W., Chen, Y., Meng, D., Zhang, L.: Beyond a Gaussian Denoiser: Residual Learning of Deep CNN for Image Denoising. IEEE Transactions on Image Processing. 26, 3142-3155 (2017).

[14] Ulyanov, D., Vedaldi, A., Lempitsky, V.: Deep image prior. arXiv Preprints. (2017).

[15] Zbontar J, Knoll F, Sriram A, et al. fastMRI: An Open Dataset and Benchmarks for Accelerated MRI. 2018. arXiv:1811.08839 [cs.CV].

[16] Maggioni M, Katkovnik V, Egiazarian K, Foi A. Nonlocal transform-domain filter for volumetric data denoising and reconstruction. IEEE Trans Image Process. 2013; 22(1):119-133. doi: 10.1109/TIP.2012.2210725.

[17] Zhang X, Zhou X, Lin M, Sun J. ShuffleNet: An Extremely Efficient Convolutional Neural Network for Mobile Devices. arXiv Preprints. 2017. arXiv:1707.01083.

[18] http://www.bic.mni.mcgill.ca/brainweb/

[19] Cocosco C A, Kollokian V, Kwan R K, Evans A C. BrainWeb: Online Interface to a 3D MRI Simulated Brain Database. NeuroImage, 1997; 5(4):5425.

[20] Kwan R K, Evans A C, Pike G B. MRI simulation-based evaluation of image-processing and classification methods. IEEE Trans Med Imaging. 1999; 18(11):1085-1097.

[21] Kwan R K, Evans A C, Pike G B. An Extensible MRI Simulator for Post-Processing Evaluation. Visualization in Biomedical Computing (VBC'96). Lecture Notes in Computer Science, vol. 1131. Springer-Verlag, 1996. 135-140.

[22] Collins D L, Zijdenbos A P, Kollokian V, et al. Design and Construction of a Realistic Digital Brain Phantom. IEEE Trans Med Imaging. 1998; 17(3):463-468.

[23] Zhang K, Zuo W, Chen Y, Meng D, Zhang L. Beyond a Gaussian Denoiser: Residual Learning of Deep CNN for Image Denoising. 13 Aug. 2016. arXiv:1608.03981 [cs.CV].

[24] Trabelsi C, Bilaniuk O, Zhang Y, et al. Deep Complex Networks. 25 Feb. 2018. arXiv:1705.09792 [cs.NE].

[25] Noll D C, Meyer C H, Pauly J M, Nishimura D G, Macovski A. A homogeneity correction method for magnetic resonance imaging with time-varying gradients. IEEE Trans Med Imaging. 1991; 10(4):629-37.

[26] Man L C, Pauly J M, Macovski A. Multifrequency interpolation for fast off-resonance correction. Magn Reson Med. 1997 May; 37(5):785-92.

[27] Ahunbay E, Pipe J G. Rapid method for deblurring spiral MR images. Magn Reson Med. 2000 September; 44(3):491-4.

[28] Sutton B P, Noll D C, Fessler J A. Fast, iterative image reconstruction for MRI in the presence of field inhomogeneities. IEEE Trans Med Imaging. 2003 February; 22(2):178-88.

[29] Noll D C, Pauly J M, Meyer C H, Nishimura D G, Macovski A. Deblurring for non-2D Fourier transform magnetic resonance imaging. Magn Reson Med. 1992 June; 25(2):319-33.

[30] Man L C, Pauly J M, Macovski A. Improved automatic off-resonance correction without a field map in spiral imaging. Magn Reson Med. 1997 June; 37(6):906-13.

[31] Zeng D Y, Shaikh J, Holmes S, Brunsing R L, Pauly J M, Nishimura D G, Vasanawala S S, Cheng J Y. Deep residual network for off-resonance artifact correction with application to pediatric body MRA with 3D cones. Magn Reson Med. 2019 October; 82(4):1398-1411.

[32] Lim Y, Bliesener Y, Narayanan S, Nayak K S. Deblurring for spiral real-time MRI using convolutional neural networks. Magn Reson Med. 2020 December; 84(6):3438-3452.

[33] Zbontar J, Knoll F, Sriram A, et al. fastMRI: An Open Dataset and Benchmarks for Accelerated MRI. 2018. arXiv:1811.08839 [cs.CV].

[34] Zbontar J, Tygert M. Simulating single-coil MRI from the responses of multiple coils. 2018. arXiv:1811.08026 [eess.IV].

[35] He K, Zhang X, Ren S, Sun J. Deep residual learning for image recognition. 2015. arXiv:1512.03385 [cs.CV].

[36] Paszke A, Gross S, Massa F, et al. PyTorch: An Imperative Style, High-Performance Deep Learning Library. 2019. arXiv:1912.01703 [cs.LG].

[37] Kingma D P, Ba J. Adam: A Method for Stochastic Optimization. 2014. arXiv:1412.6980 [cs.LG].

[38] Chen W, Meyer C H. Semiautomatic off-resonance correction in spiral imaging. Magn Reson Med. 2008 May; 59(5):1212-9.

The invention claimed is:

1. A computer-implemented method of denoising a magnetic resonance (MR) image, comprising:
acquiring complex magnetic resonance (MR) image data of an area of interest of a subject, wherein the image data comprises complex blurred images of multi-coil MR image data, and wherein the complex blurred images comprise resonant image data and off-resonance artifact data;
for each of the complex blurred images:
demodulating the complex blurred images at a selected number (n) of frequencies to form, for each of the n frequencies, a respective real component frame of the MR data and a respective imaginary component frame of the MR data;
compiling a layered data set by stacking the respective real component frames and the respective imaginary component frames;

using the layered data set as an input to a convolutional neural network (CNN) comprising a plurality of residual blocks, wherein the residual blocks comprise multiple convolution calculations paired with respective skip connections; and outputting from the CNN a de-blurred real image frame and a de-blurred imaginary image frame of the MR data for each complex blurred image.

2. The method of claim 1, further comprising:

demodulating the complex blurred images at n=11 frequencies.

3. The method of claim 1, further comprising:

compiling the layered data set as a three dimensional data set having 2n number of channels for use as the input to the CNN.

4. The method of claim 1, further comprising:

compiling the layered data set as alternating frames of the real component frames and the imaginary component frames for each selected frequency at which a respective complex blurred image has been demodulated.

5. The method of claim 1, wherein the residual blocks comprise the multiple convolutional calculations, a rectified linear unit activation, and one of the respective skip connections.

6. The method of claim 5, wherein the one of the respective skip connections adds a block input to a block output, corresponding to a respective residual block, to provide data continuity between earlier residual blocks and later residual blocks of the CNN.

7. The method of claim 1, wherein the residual blocks comprise two sequential convolutions of the layered data set.

8. The method of claim 1, wherein the CNN comprises three consecutive residual blocks of two sequential convolutions.

9. The method of claim 1, wherein the convolutional computations comprise 5×5 convolution layers with filter depths of 128 followed by rectified linear unit activations.

10. The method of claim 1, further comprising minimizing L1 loss between an output of the CNN and a ground truth image.

11. The method of claim 1, further comprising training the CNN with a ground truth image and a simulated blurred image comprising simulated blurring artifacts.

12. The method of claim 11, further comprising forming the simulated image from an in-vivo ground truth image.

13. The method of claim 11, further comprising forming the simulated image with a brain mask based on the ground truth image to simulate off-resonance changes at an air-tissue interface boundary in the ground truth image.

14. The method of claim 13, further comprising forming the brain mask by applying thresholding techniques to the ground truth image.

15. The method of claim 14, further comprising using Otsu's thresholding technique and/or a convex hull thresholding technique to create the brain mask.

16. The method of claim 15, wherein forming the simulated image comprises generating a simulated field map by forming a combination of a random 2D polynomial with at least one random 2D Gaussian function and applying the combination to the brain mask.

17. The method of claim 16, further comprising generating the simulated blurred image by applying the simulated field map to the ground truth with multifrequency interpolation, wherein the multifrequency interpolation utilizes a simulated k-space trajectory of the ground truth image.

18. The method of claim 16, further comprising utilizing random patch cropping as a training augmentation for each simulated blurred image.

19. The method of claim 11, further comprising forming the simulated image with multi-coil data.

20. The method of claim 19, further comprising forming the simulated image with emulated single coil data based on the multi-coil data.

* * * * *